(12) United States Patent
Döring et al.

(10) Patent No.: US 11,293,748 B2
(45) Date of Patent: Apr. 5, 2022

(54) SYSTEM AND METHOD FOR MEASURING THREE-DIMENSIONAL COORDINATES

(71) Applicant: FARO Technologies, Inc., Lake Mary, FL (US)

(72) Inventors: Daniel Döring, Ditzingen (DE); Gerrit Hillebrand, Waiblingen (DE); Rasmus Debitsch, Fellbach (DE); Rene Pfeiffer, Muehlacker (DE); Martin Ossig, Tamm (DE); Alexander Kramer, Kornwestheim (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 15 days.

(21) Appl. No.: 16/800,781

(22) Filed: Feb. 25, 2020

(65) Prior Publication Data
US 2020/0284574 A1    Sep. 10, 2020

Related U.S. Application Data

(60) Provisional application No. 62/815,121, filed on Mar. 7, 2019.

(51) Int. Cl.
*G01B 11/00* (2006.01)

(52) U.S. Cl.
CPC .................. *G01B 11/005* (2013.01)

(58) Field of Classification Search
CPC .... G01N 33/5308; G01N 33/74; G01N 21/51; G01N 23/046; G01N 2223/419; G01N 2223/505; G01N 33/54373; G01N 33/56972; G01N 33/82; G01N 2035/00495; G01N 2223/108; G01N 23/2255; G01N 35/10; G01N 1/4077; G01N 2001/4083; G01N 2035/1018; G01N 21/00;
(Continued)

(56) References Cited

U.S. PATENT DOCUMENTS 6,327,380 B1 * 12/2001 Sciandra ................ G01B 11/24
                                                                   382/154
6,542,249 B1 *  4/2003 Kofman ............. G01B 11/2513
                                                                   356/601
(Continued)

FOREIGN PATENT DOCUMENTS

JP    WO-2016132553 A1 *  8/2016

OTHER PUBLICATIONS

European Search Report for Application No. EP20160956.7 dated Jun. 9, 2020; 7 pgs.

*Primary Examiner* — Michael P Stafira
(74) *Attorney, Agent, or Firm* — Cantor Colburn LLP

(57) ABSTRACT

A three-dimensional (3D) measurement system, a method of measuring 3D coordinates, and a method of generating dense 3D data is provided. The method of measuring 3D coordinates includes using a first 3D measurement device and a second 3D measurement device in a cooperative manner is provided. The method includes acquiring a first set of 3D coordinates with the first 3D measurement device. The first set of 3D coordinates are transferred to the second 3D measurement device. A second set of 3D coordinates is acquired with the second 3D measurement device. The second set of 3D coordinates are registered to the first set of 3D coordinates in real-time while the second 3D measurement device is acquiring the second set of 3D coordinates.

8 Claims, 18 Drawing Sheets

(58) Field of Classification Search
CPC ............... G01N 21/0303; G01N 21/59; G01N 2333/575; G01N 2333/62; G01N 2333/91188; G01N 2333/96463; G01N 33/54326; G01N 33/54393; G01N 33/56983; G01N 33/573; G01N 33/743; G01N 33/80; G01N 33/92; G01N 21/31; G01N 21/636; G01N 2333/726; G01N 2458/00; G01N 2500/02; G01N 2500/04; G01N 33/54313; G01N 33/56966; G01N 33/583; G01N 33/587; G01N 33/6845; G01N 23/207; G01N 11/00; G01N 15/1436; G01N 15/1459; G01N 2011/008; G01N 2021/0346; G01N 2021/4707; G01N 2021/4709; G01N 2021/513; G01N 21/03; G01N 2201/08; G01N 2223/611; G01N 15/0211; G01N 2015/0222; G01N 23/201; G01N 33/582; G01N 2035/0094; G01N 21/84; G01N 2333/75; G01N 33/4905; G01N 33/86; G01N 35/0092; G01N 15/14; G01N 15/1434; G01N 2015/0038; G01N 2015/0238; G01N 2015/025; G01N 2015/0277; G01N 2035/00881; G01N 21/25; G01N 21/4795; G01N 21/6428; G01N 21/65; G01N 21/9501; G01N 21/95623; G01N 2201/0675; G01N 2201/129; G01N 2223/302; G01N 2223/306; G01N 2223/639; G01N 2223/643; G01N 2223/645; G01N 23/04; G01N 23/203; G01N 15/0205; G01N 15/1427; G01N 15/1429; G01N 15/1456; G01N 15/1463; G01N 15/1475; G01N 15/1484; G01N 2015/0053; G01N 2015/0092; G01N 2015/1006; G01N 2015/1075; G01N 2015/1402; G01N 2015/1438; G01N 2015/1454; G01N 2021/1785; G01N 2021/479; G01N 2021/6471; G01N 2030/8447; G01N 2035/00326; G01N 21/53; G01N 21/6408; G01N 21/645; G01N 21/6458; G01N 2201/1045; G01N 23/041; G01N 23/18; G01N 23/20; G01N 23/20008; G01N 23/20016; G01N 23/20025; G01N 23/205; G01N 23/2055; G01N 30/74; G01N 33/381; G01N 33/552; G01N 33/553; G01N 35/00069; G01N 35/00871; G01N 35/026; G01N 35/1065; G01N 35/1097; G01N 33/386; G01N 21/88; G01N 21/9515; G01N 2021/9544; G01N 2021/9548; G01N 21/8806; G01N 21/8851; G01N 21/91; G01N 21/954; G01N 33/38; G01B 11/16; G01B 11/165; G01B 11/002; G01B 11/026; G01B 11/24; G01B 21/04; G01B 5/008; G01B 11/005; G01B 11/03; G01B 11/14; G01B 11/25; G01B 11/2504; G01B 11/2518; G01B 11/2545; G01B 21/042; G01B 2210/60; G01B 11/022; G01B 11/2522; G01B 11/2513; G01B 11/245; G01B 11/00; G01B 21/045; G01B 2290/15; G01B 5/012; G01B 9/02002; G01B 11/2531; G01B 5/004; G01B 11/22; G01B 11/2509; G01B 21/047; G01B 2210/52; G01B 2210/58; G01B 11/007; G01B 11/06; G01B 3/30; G01B 5/0004; G02B 26/105; G02B 5/0858; G02B 5/08; G02B 2027/0138; G02B 27/0172; G02B 6/4246; G02B 6/4286; G02B 2027/014; G02B 2027/0178; G02B 6/0011; G02B 6/2706; G02B 6/42; G02B 6/4206; G02B 6/4214; G02B 6/4215; G02B 6/4221; G02B 6/423; G02B 7/003; G02B 21/0072; G02B 21/16; G02B 21/34; G02B 21/365; G02B 21/367; G02B 27/09; G02B 27/0927; G02B 27/0961; G02B 27/32; G02B 27/58; G02B 3/0043; G02B 3/005; G02B 3/0056; G02B 3/0068

See application file for complete search history.

(56) References Cited

U.S. PATENT DOCUMENTS

| | | | |
|---|---|---|---|
| 7,403,268 B2* | 7/2008 | England | G01C 15/002 356/4.01 |
| 7,804,602 B2 | 9/2010 | Raab | |
| 8,265,376 B2 | 9/2012 | Tsuk et al. | |
| 8,630,314 B2 | 1/2014 | York | |
| 9,036,134 B2 | 5/2015 | Steffey et al. | |
| 9,188,430 B2 | 11/2015 | Atwell et al. | |
| 9,513,107 B2 | 12/2016 | Zweigle et al. | |
| 9,652,852 B2 | 5/2017 | Becker et al. | |
| 9,686,532 B2 | 6/2017 | Tohme | |
| 9,741,093 B2 | 8/2017 | Becker et al. | |
| 9,746,560 B2 | 8/2017 | Steffey et al. | |
| 9,747,662 B2 | 8/2017 | Becker et al. | |
| 9,761,016 B1 | 9/2017 | Becker et al. | |
| 9,965,829 B2 | 5/2018 | Becker et al. | |
| 9,967,545 B2 | 5/2018 | Tohme | |
| 10,455,216 B2 | 10/2019 | Raab et al. | |
| 10,540,813 B1* | 1/2020 | Uhlenbrock | G06F 16/2228 |
| 2010/0166294 A1* | 7/2010 | Marrion | G06K 9/00214 382/154 |
| 2011/0157373 A1* | 6/2011 | Ye | G06T 7/85 348/187 |
| 2014/0253929 A1* | 9/2014 | Huang | G01N 21/8806 356/611 |
| 2014/0268108 A1* | 9/2014 | Grau | G01B 11/14 356/72 |
| 2015/0070468 A1* | 3/2015 | Pfeffer | G01B 21/045 348/46 |
| 2015/0317816 A1* | 11/2015 | Bendall | H04N 5/374 345/419 |
| 2016/0047914 A1 | 2/2016 | Zweigle | |
| 2016/0073091 A1 | 3/2016 | Hillebrand et al. | |
| 2016/0093099 A1 | 3/2016 | Bridges | |
| 2016/0207551 A1* | 7/2016 | Mesher | B61L 23/047 |
| 2016/0291160 A1 | 10/2016 | Zweigle et al. | |
| 2016/0323565 A1* | 11/2016 | van Baarsen | H04N 13/271 |
| 2018/0213203 A1* | 7/2018 | Miyashita | G06T 7/70 |
| 2018/0374239 A1* | 12/2018 | Wallack | H04N 13/246 |
| 2019/0257644 A1* | 8/2019 | Hillebrand | G01B 11/2518 |
| 2019/0285404 A1* | 9/2019 | Wohlfeld | G01B 11/2513 |
| 2019/0367061 A1* | 12/2019 | Mesher | B61L 23/045 |
| 2020/0211293 A1* | 7/2020 | Kim | G06T 17/00 |

* cited by examiner

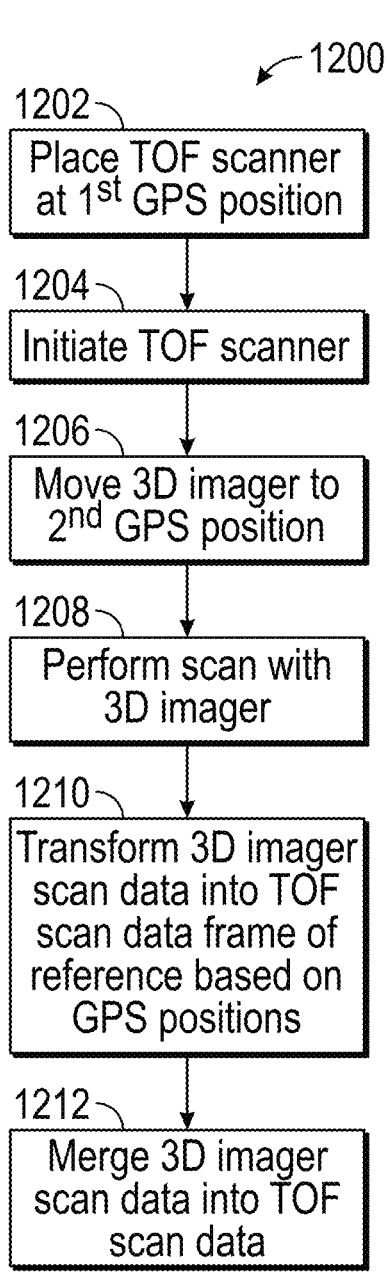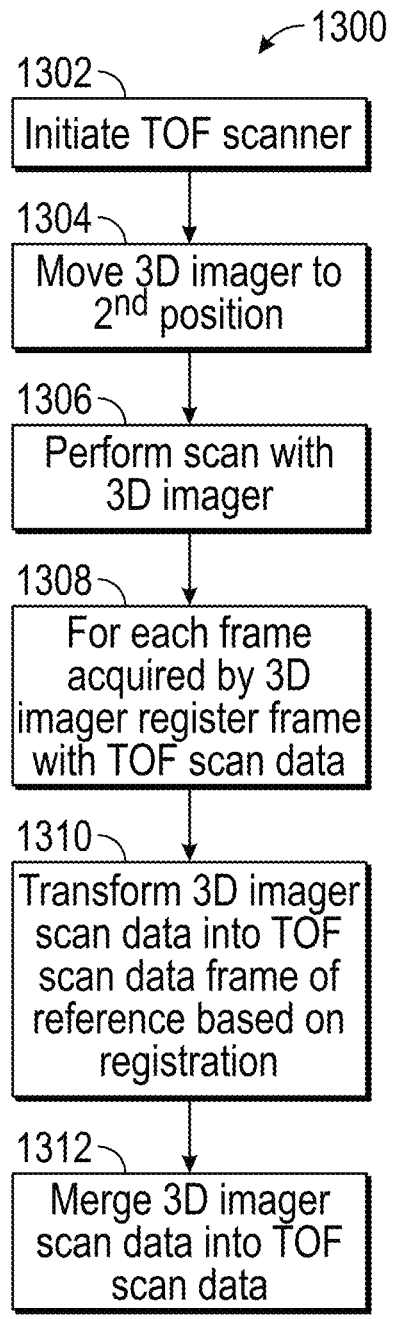
FIG. 12
FIG. 13

SYSTEM AND METHOD FOR MEASURING THREE-DIMENSIONAL COORDINATES

CROSS REFERENCE TO RELATED APPLICATIONS

This application claims the benefit of U.S. Provisional Application Ser. No. 62/815,121, filed Mar. 7, 2019, the entire disclosure of which is incorporated herein by reference.

BACKGROUND

The subject matter disclosed herein relates to a system for measuring three-dimensional (3D) coordinates of an environment or objects, and in particular to a system having both a triangulation imager device and a time-of-flight scanning device that cooperate to determine the 3D coordinates.

A 3D imager is a portable device includes a projector that projects light patterns on the surface of an object to be scanned. Typically the projector emits a coded or uncoded pattern. One (or more) cameras, having a predetermined positions and alignment relative to the projector, which record images of the light pattern on the surface of an object. The three-dimensional coordinates of elements in the light pattern can be determined by trigonometric methods, such as by using epipolar geometry.

Other types of noncontact devices may also be used to measure 3D coordinates, such as those that use time of flight techniques (e.g. laser trackers, laser scanners or time of flight cameras). These devices emit a light beam and measure the amount of time it takes for light to travel to the surface and return to the device to determine the distance. Typically, the time-of-flight (TOF) scanner is stationary and includes mechanisms to rotate about two orthogonal axis to direct the light beam in a direction. By knowing the distance and the two angles, 3D coordinates may be determined. It should be appreciated that since the TOF scanner is stationary, some areas of the environment may not be readily measured due to obstructions.

Accordingly, while existing systems that measure 3D coordinates are suitable for their intended purpose the need for improvement remains, particularly in providing a system that allows multiple devices to cooperate in measuring 3D coordinates of an environment.

BRIEF DESCRIPTION

According to one aspect of the disclosure, a three-dimensional (3D) measurement system is provided. The 3D measurement system includes a first 3D measurement device, a second 3D measurement device, and a processor. The first 3D measurement device being operable to measure and determine a first set of three-dimensional coordinates of a first surface in an environment and of a second surface, the first set of three-dimensional coordinates being in a first coordinate frame of reference. The second 3D measurement device includes the second surface, the second 3D measurement device being operable to measure and determine a second set of three-dimensional coordinates of a third surface in the environment, the second set of three-dimensional coordinates being in a second coordinate frame of reference. The processor is operably coupled to the first 3D measurement device and the second 3D measurement device, the processor operable to execute nontransitory computer instructions when executed on the processor for transforming the first set of three-dimensional coordinates and the second set of three-dimensional coordinates into a common coordinate frame of reference, wherein the transformation is based at least in part on a portion of the first set of three-dimensional coordinates on the second surface.

Additionally or alternatively, in this or other embodiments the processor is further operable to identify the second 3D measurement device based at least in part on the portion of the first set of three-dimensional coordinates. Additionally or alternatively, in this or other embodiments the processor is further operable to determine a location and orientation of the second 3D measurement device based at least in part on the portion of the first set of three-dimensional coordinates. Additionally or alternatively, in this or other embodiments the transforming of the second set of coordinates is based at least in part on the location and orientation of the second 3D measurement device.

Additionally or alternatively, in this or other embodiments a user interface associated with the second 3D measuring device. Wherein the processor is further responsive to display the first set of three-dimensional coordinates on the user interface and display a graphical indicator in an area having a parameter less than a threshold. Additionally or alternatively, in this or other embodiments the parameter is a density of 3D coordinates in the area.

According to another aspect of the disclosure, a method of measuring three-dimensional (3D) coordinates using a first 3D measurement device and a second 3D measurement device in a cooperative manner is provided. The method includes acquiring a first set of 3D coordinates with the first 3D measurement device. The first set of 3D coordinates are transferred to the second 3D measurement device. A second set of 3D coordinates is acquired with the second 3D measurement device. The second set of 3D coordinates are registered to the first set of 3D coordinates in real-time while the second 3D measurement device is acquiring the second set of 3D coordinates.

Additionally or alternatively, in this or other embodiments the method further comprises displaying the first set of 3D coordinates and the second set of 3D coordinates on a display after registration. Additionally or alternatively, in this or other embodiments the method further comprises displaying the first set of 3D coordinates on a display associated with the second 3D measurement device. Additionally or alternatively, in this or other embodiments the method further comprises displaying a graphical indicator on the display indicating an area where the first set of 3D coordinates have a parameter less than a threshold.

Additionally or alternatively, in this or other embodiments the parameter is a density of 3D coordinates in the area. Additionally or alternatively, in this or other embodiments the registration of the second set of 3d coordinates to the first set of 3d coordinates is based on natural textures, natural geometry, artificial textures, artificial geometry or a combination thereof. Additionally or alternatively, in this or other embodiments the first set of 3D coordinates includes a portion of 3D coordinates located on the second 3D measurement device.

According to one aspect of the disclosure, a three-dimensional (3D) measurement system is provided. The 3D measurement system comprising a first 3D measurement device, a second 3D measurement device, a display, and one or more processors. The first 3D measurement device being operable to measure and determine a first set of three-dimensional coordinates of a first surface in an environment, the first set of three-dimensional coordinates being in a first coordinate frame of reference. The a second 3D measurement device being operable to measure and determine a second set of three-dimensional coordinates of a second surface in the environment, the second set of three-dimensional coordinates being in a second coordinate frame of reference. The display being operably coupled to one of the first 3D measurement device or the second 3D measurement device. The one or more processors being operably coupled to the first 3D measurement device or the second 3D measurement device, the one or more processors operable to execute nontransitory computer instructions when executed on the processor for displaying a graphical indicator on the display indicating an area based in part on the first set of 3D coordinates having a parameter less than a threshold.

Additionally or alternatively, in this or other embodiments the parameter is a density of 3D coordinates in the area. Additionally or alternatively, in this or other embodiments the one or more processors are further responsive to displaying the indicator based in part on a combination of the first set of 3D coordinates and the second set of 3D coordinates having the parameter less than the threshold.

According to another aspect of the disclosure, a method of generating a dense 3D data set is provided. The method includes acquiring a first set of data, the first set of data including a dense 3D data set and a dense 2D image. A first sequence having a first plurality of frames of data is acquired, each frame of the first plurality of frames having dense 2D data and sparse 3D data, wherein the 3D data in each of the first plurality of frames has a 3D density below a threshold that allows the frames to be registered to the first set of data. Each of the first plurality of frames of data are aligned within the first sequence to each other based at least in part on the first set of data. The aligned first plurality of frames and the first set of data are stored in memory.

Additionally or alternatively, in this or other embodiments the first plurality of frames is aligned to the first set of data, and the alignment of the first plurality of frames of data is further based at least in part on the 2D data of each of the first plurality of frames.

Additionally or alternatively, in this or other embodiments the method further includes aligning each of the frames of the first plurality of frames to each other based on the 2D data and the 3D data of each frame of the first plurality of frames. Additionally or alternatively, in this or other embodiments the method further includes realigning the frames of the first plurality of frames based at least in part on the first set of data. Additionally or alternatively, in this or other embodiments the realignment of the frames is based at least in part on a weighting between the alignment to the first set of data and the alignment using the 2D data and the 3D data of each frame of the first plurality of frames.

Additionally or alternatively, in this or other embodiments the method further includes acquiring a second sequence having a second plurality of frames of data, each of the frames of the second plurality of frames having dense 2D data and sparse 3D data. Each of the frames of the second plurality of frames are also aligned to each other based on the 2D data and the 3D data of each frame of the second plurality of frames. Additionally or alternatively, in this or other embodiments the method further includes aligning the first sequence with the first set of data based at least in part on the 3D data of the first sequence. The second sequence with the first set of data and the first sequence are also aligned based at least in part on the 3D data of the second sequence, the 3D data of the first sequence and the first set of data.

Additionally or alternatively, in this or other embodiments the method further includes realigning each of the frames of the first plurality of frames and the second plurality of frames based at least in part on the alignment of the first sequence and the second sequence to the first set of data and the alignment of the second sequence with the first sequence. Additionally or alternatively, in this or other embodiments the first sequence and the second sequence spatially overlap. Additionally or alternatively, in this or other embodiments the first sequence and the second sequence do not spatially overlap.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 12 is a flow diagram of a method of operating a 3D measurement system having a 3D imager and a 3D scanner of FIG. 11 and FIG. 4 respectively, in accordance with another embodiment;

FIG. 13 is a flow diagram of a method of operating a 3D measurement system having a 3D imager and a 3D scanner of FIG. 11 and FIG. 4 respectively in accordance with another embodiment;

The detailed description explains embodiments of the disclosure, together with advantages and features, by way of example with reference to the drawings.

DETAILED DESCRIPTION

Embodiments of the invention provide for a three-dimensional (3D) measurement system that allows the cooperative use of multiple coordinate measurement devices. Embodiments of the invention provide for using a triangulation imager device to acquire 3D coordinates of surfaces not measurable by a time of flight (TOF) measurement device. Still further embodiments provide for using a imager device in cooperation with a TOF measurement device to increase a point cloud density.

Figure 1:
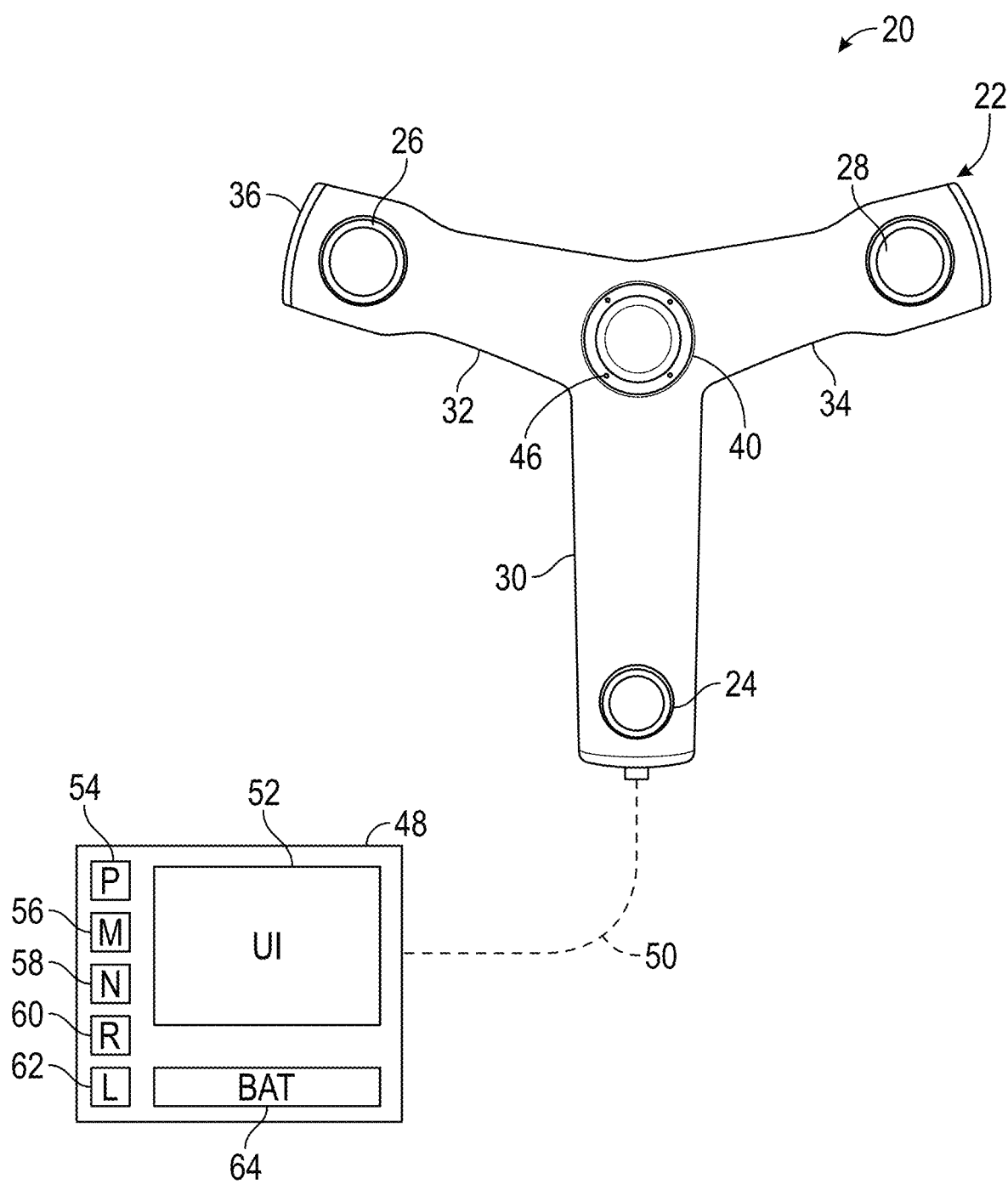
FIG. 1 is a view of a 3D imager system in accordance with an embodiment.

Referring now to FIG. 1, a measurement device, such as 3D imager system 20, is shown for determining 3D coordinates of surfaces in an environment. The system 20 includes an image scanner 22 having a projector 24, a first camera 26 and a second camera 28. In the exemplary embodiment, the projector 24, and cameras 26, 28 are each disposed in a separate arms 30, 32, 34 of a housing 36 respectively. A color camera 40 may be centrally disposed on the housing 36 between the arms 30, 32, 34. In the exemplary embodiment, the color camera 40 has a field of view that acquires images, including color information, of the environment being scanned. In an embodiment, the color camera 40 may be used to provide color (texture) information for incorporation into the 3D image. In some embodiments, the camera 40 acquires a video image may be used to register multiple 3D images through the use of videogrammetry. The color camera 40 is sometimes referred to as an RGB camera. In an embodiment discussed below, the image scanner 22 may further have an annotation device, such as a microphone or a laser light source that emits a visible beam of light. In an embodiment, the laser light source may include an assembly, such as a digital micromirror device (DMD) or galvomirrors for example, that allows the visible beam of light to be moved relative to the image scanner 22.

As discussed in more detail herein, in an embodiment the projector 24 projects a pattern of light onto a surfaces in the environment. As used herein, the term "projector" is defined to generally refer to a device for producing a pattern. The generation of the pattern can take place by means of deflecting methods, such as generation by means of diffractive optical elements or micro-lenses (or single lasers), or by shading methods, for example the production by means of shutters, transparencies (as they would be used in a transparency projector) and other masks. The deflecting methods have the advantage of less light getting lost and consequently a higher intensity being available.

Figure 6:
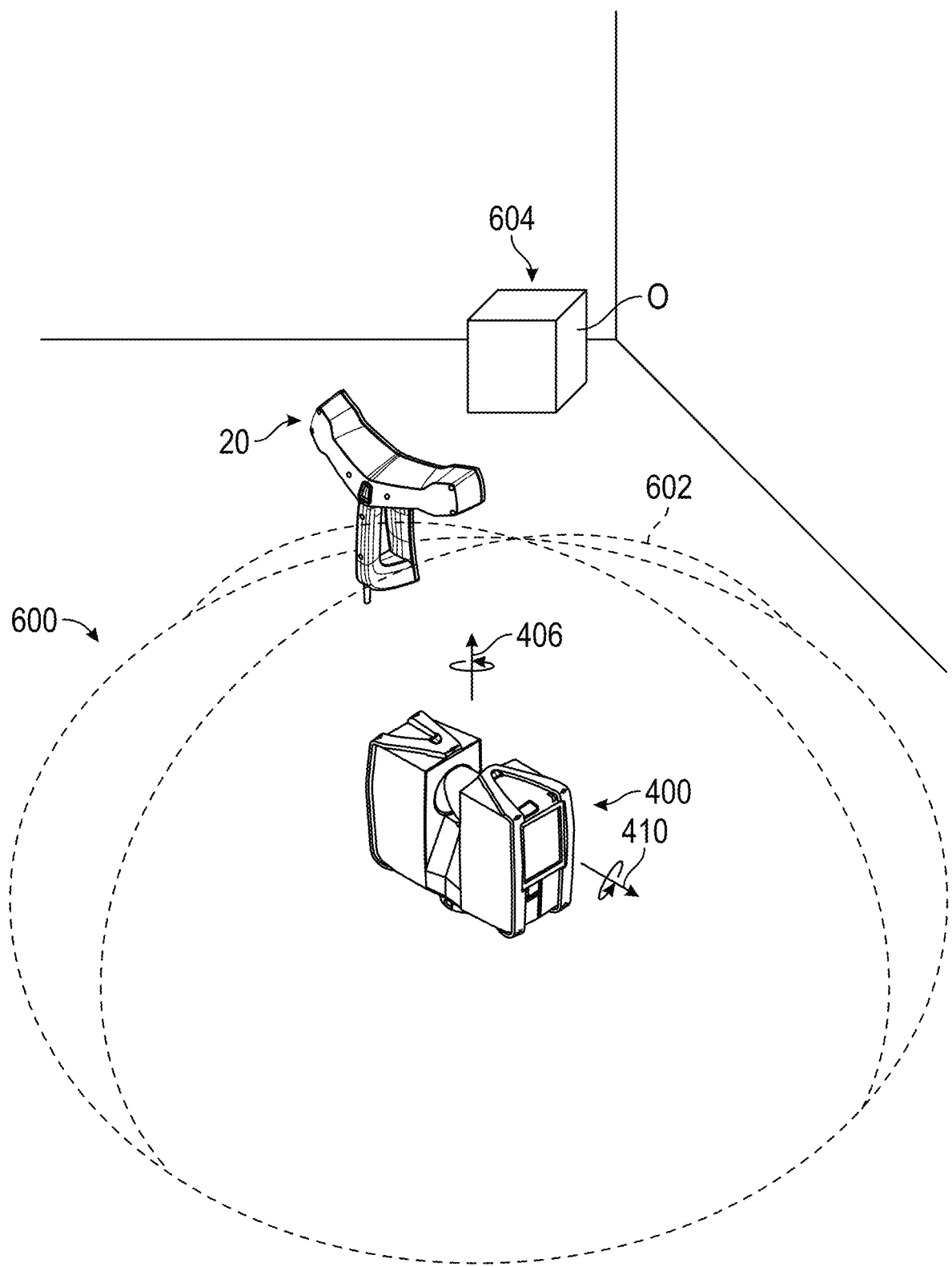
FIG. 6 is a perspective view of 3D measurement system having the 3D imager and the 3D scanner of FIG. 1 and FIG. 4 respectively in accordance with an embodiment.

The cameras 26, 28 acquire images of the pattern and in some instances able to determine the 3D coordinates of points on the surface using trigonometric principles, e.g. epipolar geometry. In one embodiment, the projector 24 produces the pattern on the objects only during the time periods when the cameras 26, 28 (and if available camera 40) are recording images of the objects O (FIG. 6). This provides advantages in energy efficiency and helps for eye protection considerations. The two cameras 26, 28 and the projector 24 are synchronized or coordinated with each other, with regard to both, time and the pattern used. Each recording process the projector 24 producing the pattern, similar to a flash in photography, and the cameras 26, 28 (and, if available camera 40) acquire pairs of images, in other words one image each from each of the two cameras 26, 28. In the exemplary embodiment, the projection of the pattern and the acquisition of the images is performed simultaneously. As used herein, these pairs (or triples) of images that are acquired at substantially the same time are referred to as "frames." The recording process can comprise one single frame (shot), or a sequence of a plurality of frames (video). After processing of the data, each frame then constitutes a 3D-scan consisting of a point cloud in the three-dimensional space. This point cloud is defined in the relative local coordinate system of the 3D imager system 20.

It should be appreciated that while the illustrated embodiments show and describe the device that determines 3D coordinates as being an image scanner, this is for exemplary purposes and the claimed invention should not be so limited. In other embodiments, devices that use other noncontact means for measuring 3D coordinates may also be used, such as a laser scanner device that uses time-of-flight to determine the distance to the surface.

A controller 48 is coupled for communication to the projector 24, cameras 26, 28, 40. It should be appreciated that while embodiments herein describe the controller 48 as being separate from the housing 36, in some embodiments one or more components described herein with respect to the controller 48 may be positioned within the housing 36. The connection may be a wired-connection/data-transmission-media 50 or a wireless connection. The controller 48 is a suitable electronic device capable of accepting data and instructions, executing the instructions to process the data, and presenting the results. Controller 48 may accept instructions through user interface 52, or through other means such as but not limited to electronic data card, voice activation means, manually-operable selection and control means, radiated wavelength and electronic or electrical transfer.

Controller 48 uses signals act as input to various processes for controlling the system 20. The digital signals represent one or more system 20 data including but not limited to images acquired by cameras 26, 28, 40, temperature, ambient light levels, operator inputs via user interface 52 and the like.

Controller 48 is operably coupled with one or more components of system 20, such as the image scanner 22 for example, by data transmission media 50. Data transmission media 50 includes, but is not limited to, twisted pair wiring, coaxial cable, and fiber optic cable. Data transmission media 50 also includes, but is not limited to, wireless, radio and infrared signal transmission systems. Controller 48 is configured to provide operating signals to these components and to receive data from these components via data transmission media 50.

In general, controller 48 accepts data from cameras 26, 28, 40 and projector 24, and is given certain instructions for the purpose of determining the 3D coordinates of points on surfaces being scanned. The controller 48 may compare the operational parameters to predetermined variances and if the predetermined variance is exceeded, generates a signal that may be used to indicate an alarm to an operator or to a remote computer via a network. Additionally, the signal may initiate other control methods that adapt the operation of the system 20 such as changing the operational state of cameras 26, 28, 40, projector 24 or a light source 46 to compensate for the out of variance operating parameter.

The data received from cameras 26, 28, 40 may be displayed on a user interface 52. The user interface 52 may be an LED (light-emitting diode) display, an LCD (liquid-crystal diode) display, a CRT (cathode ray tube) display, a touch-screen display or the like. A keypad may also be coupled to the user interface for providing data input to controller 48. In an embodiment, the controller 48 displays in the user interface 52 a point cloud to visually represent the acquired 3D coordinates. In an embodiment, the user interface 52 is integrated into the housing 36.

In addition to being coupled to one or more components within system 20, controller 48 may also be coupled to external computer networks such as a local area network (LAN) and the Internet. A LAN interconnects one or more remote computers, which are configured to communicate with controller 48 using a well-known computer communications protocol such as TCP/IP (Transmission Control Protocol/Internet(^) Protocol), RS-232, ModBus, and the like. Additional systems 20 may also be connected to LAN with the controllers 48 in each of these systems 20 being configured to send and receive data to and from remote computers and other systems 20. The LAN is connected to the Internet. This connection allows controller 48 to communicate with one or more remote computers connected to the Internet.

Controller 48 includes a processor 54 coupled to a random access memory (RAM) device 56, a non-volatile memory (NVM) device 58, a read-only memory (ROM) device 60, one or more input/output (I/O) controllers, and a LAN interface device 62 via a data communications bus.

Figure 8:
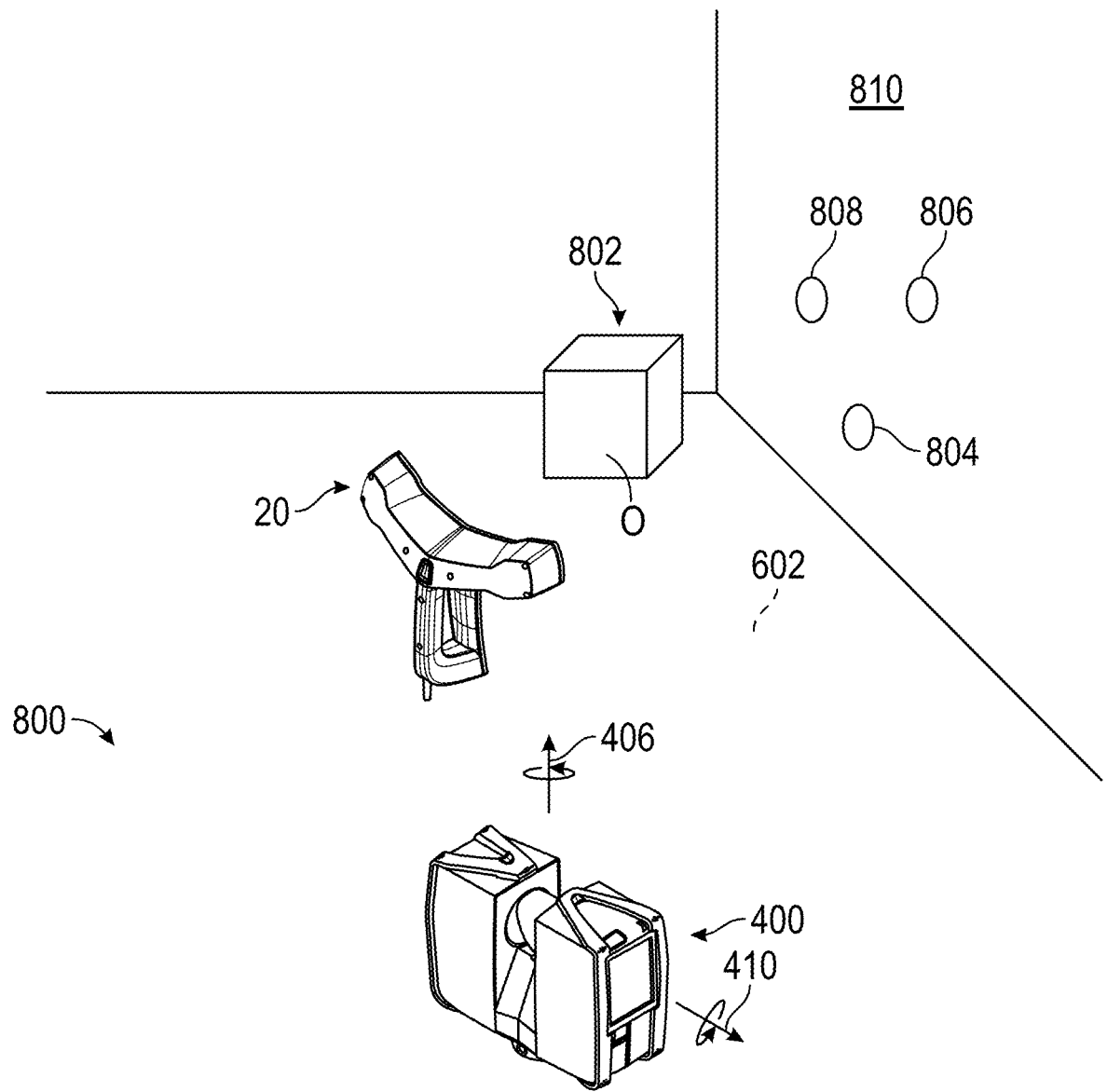
FIG. 8 is a perspective view of another 3D measurement system having the 3D imager and 3D scanner of FIG. 1 and FIG. 4 respectively, in accordance with another embodiment.

LAN interface device 62 provides for communication between controller 48 and a network in a data communications protocol supported by the network. ROM device 60 stores an application code, e.g., main functionality firmware, including initializing parameters, and boot code, for processor 54. Application code also includes program instructions as shown in FIG. 8 for causing processor 54 to execute any system 20 operation control methods, including starting and stopping operation, changing operational states of projector 24 and annotation device 47, monitoring predetermined operating parameters, and generation of alarms. In an embodiment, the application code creates an onboard telemetry system may be used to transmit operating information between the system 20 and one or more remote computers or receiving locations. The information to be exchanged remote computers and the controller 48 include but are not limited to 3D coordinate data and images.

NVM device 58 is any form of non-volatile memory such as an EPROM (Erasable Programmable Read Only Memory) chip, a disk drive, or the like. Stored in NVM device 58 are various operational parameters for the application code. The various operational parameters can be input to NVM device 58 either locally, using a user interface 52 or remote computer, or remotely via the Internet using a remote computer. It will be recognized that application code can be stored in NVM device 58 rather than ROM device 60.

Figure 7:
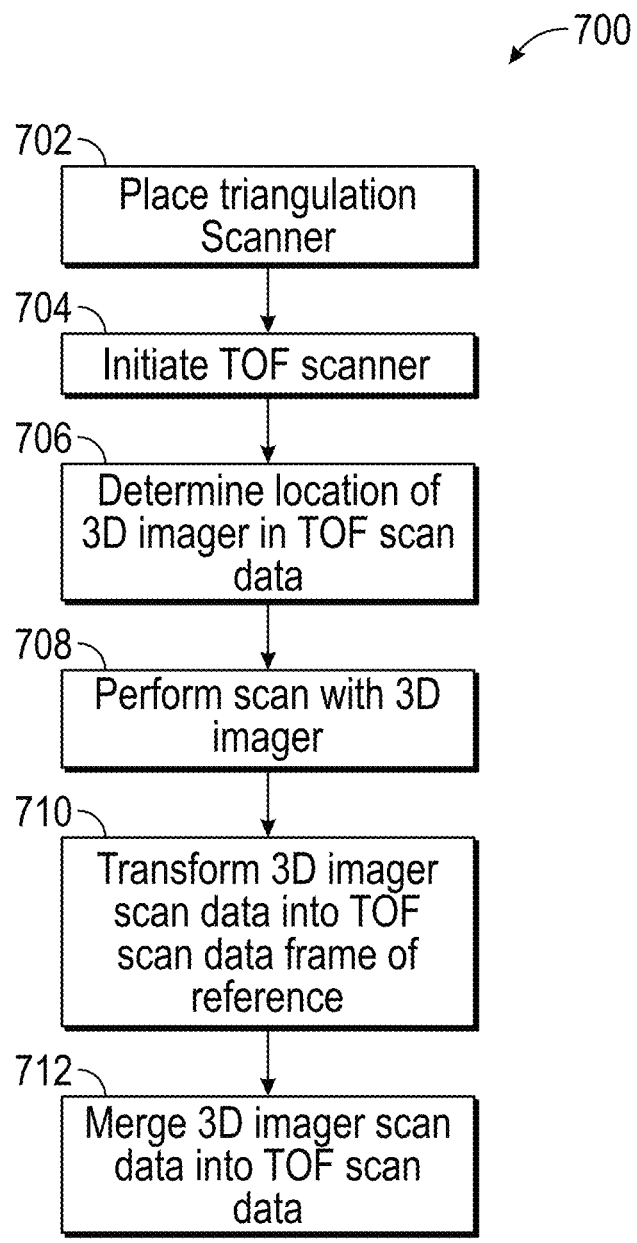
FIG. 7 is a flow diagram of a method of operating the 3D measurement system of FIG. 6.

Controller 48 includes operation control methods embodied in application code such as that shown in FIG. 7 for example. These methods are embodied in computer instructions written to be executed by processor 54, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, Visual C++, C#, Objective-C, Java, Javascript ALGOL (algorithmic language), BASIC (beginners all-purpose symbolic instruction code), visual BASIC, ActiveX, HTML (HyperText Markup Language), Python, Ruby and any combination or derivative of at least one of the foregoing. Additionally, an operator can use an existing software application such as a spreadsheet or database and correlate various cells with the variables enumerated in the algorithms. Furthermore, the software can be independent of other software or dependent upon other software, such as in the form of integrated software.

In an embodiment, the controller 48 may be configured to process data furnished to generate the 3D scans from the frames. The 3D scans in turn are joined or registered in a common coordinate frame of reference. For registering, the known methods can be used, such as by identifying natural or artificial targets (i.e. recognizable structures) in overlapping areas of two or more frames. As used herein, a natural target or feature may include a texture (e.g. colors) or a geometric element (e.g. a corner, an edge or a plane). Similarly, an artificial target or feature may include texture (e.g. a marker with colors) or a three-dimensional object (e.g. a spherical target) that are place on or around the object or surfaces to be measured. In an embodiment, the multiple frames are dynamically registered using a local bundle adjustment method. Through identification of these targets, the assignment of the two 3D scans may be determined by means of corresponding pairs. A whole scene (a plurality of frames) is thus gradually registered by the 3D imager 20. As will be discussed in more detail with reference to FIG. 13, in some embodiments, the individual frames are registered to a point cloud generated by a laser scanner.

In an embodiment, the controller 48 further includes an energy source, such as battery 64. The battery 64 may be an electrochemical device that provides electrical power for the controller 48. In an embodiment, the battery 64 may also provide electrical power to the cameras 26, 28, 40 and the projector 24. In some embodiments, the battery 64 may be separate from the controller (e.g. a battery pack). In an embodiment, a second battery (not shown) may be disposed in the housing 36 to provide electrical power to the cameras 26, 28, 40 and projector 24. In still further embodiments, the light source 46 may have a separate energy source (e.g. a battery pack).

It should be appreciated that while the controller 48 is illustrated as being separate from the housing 36, this is for exemplary purposes and the claims should not be so limited. In other embodiments, the controller 48 is integrated into the housing 36. Further, while embodiments herein illustrate the controller 48 as being coupled with a single image scanner 22, this is for exemplary purposes and the claims should not be so limited. In other embodiments, the controller 48 may be coupled to and combine three-dimensional coordinate data from multiple image scanners 22.

Figure 2:
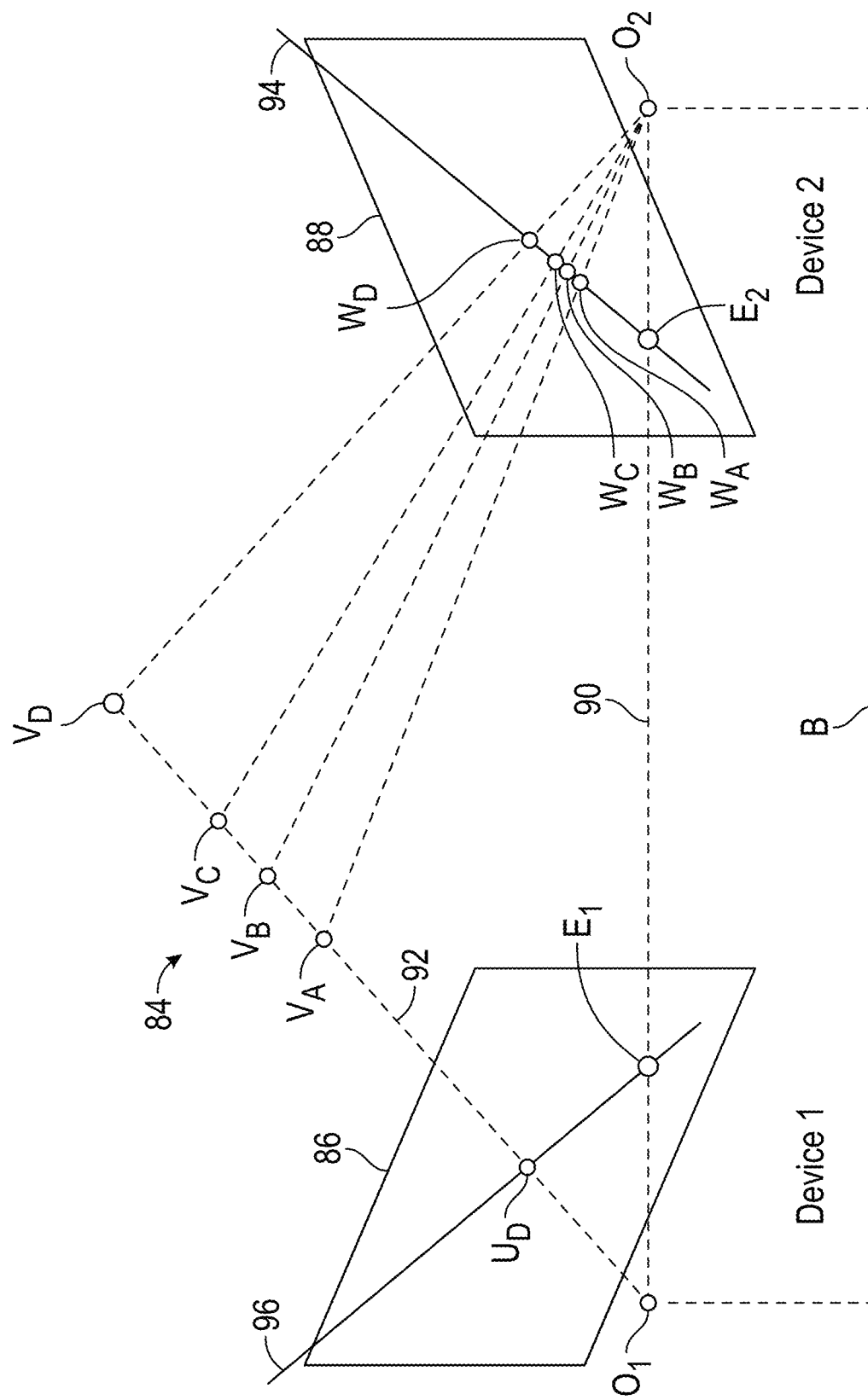
FIG. 2 and FIG. 3 are schematic illustrations of the principle of operation of the 3D imager of FIG. 1.

In the illustrated embodiment, the projector 24 and cameras 26, 28 are arranged spaced apart in a triangular arrangement where the relative distances and positions between the components is known. The triangular arrangement is advantageous in providing information beyond that available for two cameras and a projector arranged in a straight line or from a system with a projector and a single camera. The additional information may be understood in reference to FIG. 2, which explain the concept of epipolar constraints, and FIG. 3 that explains how epipolar constraints are advantageously applied to the triangular arrangement of the system 20. In FIG. 2, a 3D triangulation instrument 84 includes a device 1 and a device 2 on the left and right sides as view from the viewpoint of FIG. 2, respectively. Device 1 and device 2 may be two cameras or device 1 and device 2 may be one camera and one projector. Each of the two devices, whether a camera or a projector, has a perspective center, $O_1$ and $O_2$, and a representative plane, 86 or 88. The perspective centers are separated by a baseline distance B, which is the length of the line 90. The perspective centers $O_1$, $O_2$ are points through which rays of light may be considered to travel, either to or from a point on a surface in the area of the environment being scanned. These rays of light either emerge from an illuminated projector pattern or impinge on a photosensitive array. The placement of the reference planes 86, 88 is applied in FIG. 2, which shows the reference planes 86, 88 between the object point and the perspective centers $O_1$, $O_2$.

In FIG. 2, for the reference plane 86 angled toward the perspective center $O_2$ and the reference plane 88 angled toward the perspective center $O_1$, a line 90 drawn between the perspective centers $O_1$ and $O_2$ crosses the planes 86 and 88 at the epipole points $E_1$, $E_2$, respectively. Consider a point $U_D$ on the plane 86. If device 1 is a camera, it is known that an object point that produces the point $U_D$ on the image lies on the line 92. The object point might be, for example, one of the points $V_A$, $V_B$, $V_C$, or $V_D$. These four object points correspond to the points $W_A$, $W_B$, $W_C$, $W_D$, respectively, on the reference plane 88 of device 2. This is true whether device 2 is a camera or a projector. It is also true that the four points lie on a straight line 94 in the plane 88. This line, which is the line of intersection of the reference plane 88 with the plane of $O_1$-$O_2$-$U_D$, is referred to as the epipolar line 94. It follows that any epipolar line on the reference plane 88 passes through the epipole $E_2$. Just as there is an epipolar line on the reference plane of device 2 for any point on the reference plane of device 1, there is also an epipolar line 96 on the reference plane of device 1 for any point on the reference plane of device 2.

Figure 3:
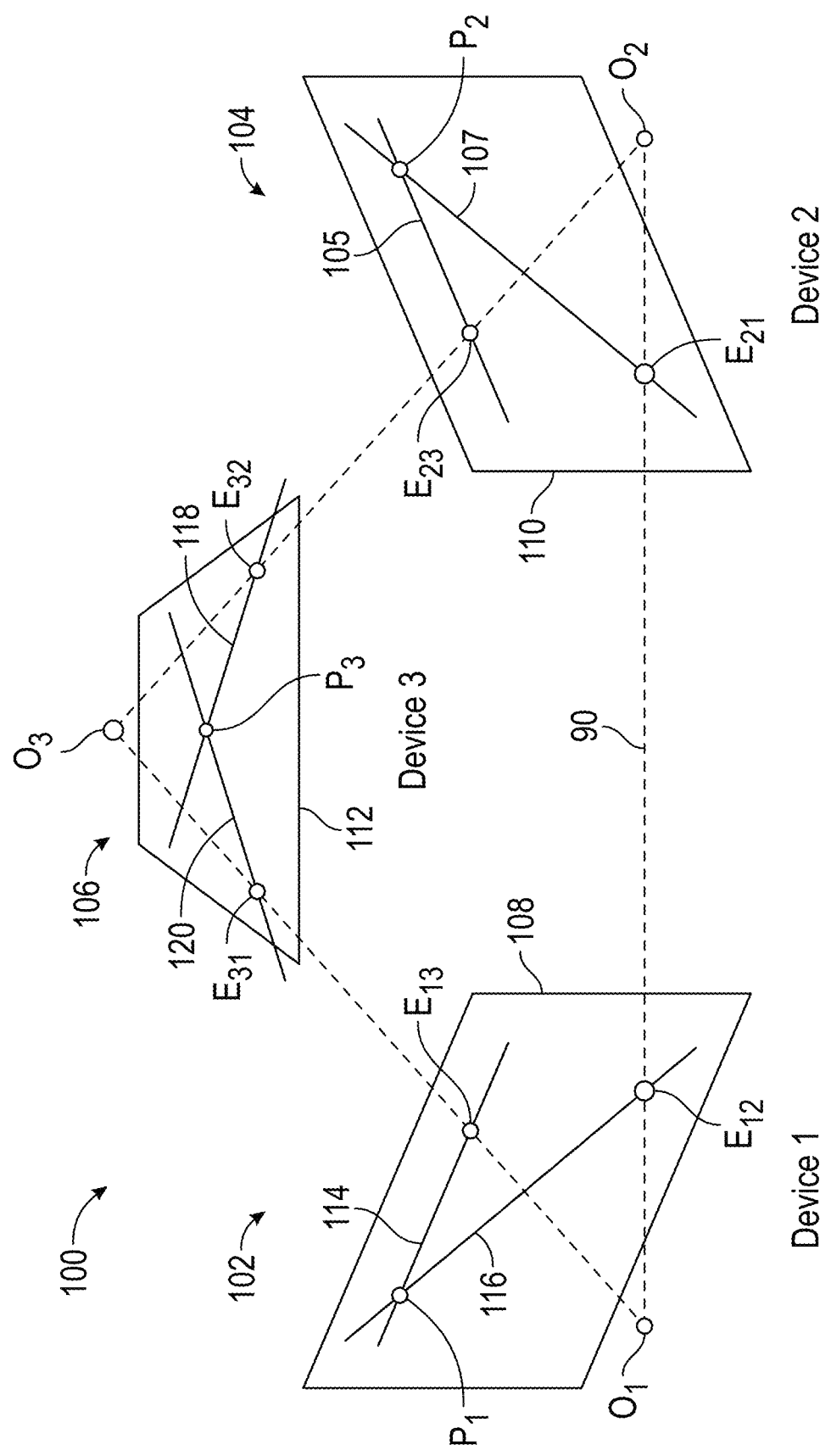

FIG. 3 illustrates the epipolar relationships for a 3D imager 100 corresponding to triangulation instrument 84 of FIG. 2 in which two cameras and one projector are arranged in a triangular pattern. In general, the device 1, device 2, and device 3 may be any combination of cameras and projectors as long as at least one of the devices is a camera. Each of the three devices 102, 104, 106 has a perspective center $O_1$, $O_2$, $O_3$, respectively, and a reference plane 108, 110, and 112, respectively. Each pair of devices has a pair of epipoles. Device 1 and device 2 have epipoles $E_{12}$, $E_{21}$ on the planes 108, 110, respectively. Device 1 and device 3 have epipoles $E_{13}$, $E_{31}$, respectively on the planes 108, 112, respectively. Device 2 and device 3 have epipoles $E_{23}$, $E_{32}$ on the planes 110, 112, respectively. In other words, each reference plane includes two epipoles. The reference plane for device 1 includes epipoles $E_{12}$ and $E_{13}$. The reference plane for device 2 includes epipoles $E_{21}$ and $E_{23}$. The reference plane for device 3 includes epipoles $E_{31}$ and $E_{32}$.

Consider the embodiment of FIG. 3 in which device 3 is a projector, device 1 is a first camera, and device 2 is a second camera. Suppose that a projection point $P_3$, a first image point $P_1$, and a second image point $P_2$ are obtained in a measurement. These results can be checked for consistency in the following way.

To check the consistency of the image point $P_1$, intersect the plane $P_3$-$E_{31}$-$E_{13}$ with the reference plane 108 to obtain the epipolar line 114. Intersect the plane $P_2$-$E_{21}$-$E_{12}$ to obtain the epipolar line 116. If the image point $P_1$ has been determined consistently, the observed image point $P_1$ will lie on the intersection of the determined epipolar line 114 and line 116.

To check the consistency of the image point $P_2$, intersect the plane $P_3$-$E_{32}$-$E_{23}$ with the reference plane 110 to obtain the epipolar line 105. Intersect the plane $P_1$-$E_{12}$-$E_{21}$ to obtain the epipolar line 107. If the image point $P_2$ has been determined consistently, the observed image point $P_2$ will lie on the intersection of the determined epipolar lines 107 and 105.

To check the consistency of the projection point $P_3$, intersect the plane $P_2$-$E_{23}$-$E_{32}$ with the reference plane 110 to obtain the epipolar line 118. Intersect the plane $P_1$-$E_{13}$-$E_{31}$ to obtain the epipolar line 120. If the projection point $P_3$ has been determined consistently, the projection point $P_3$ will lie on the intersection of the determined epipolar line 118 and line 120.

The redundancy of information provided by using a 3D imager 100 having a triangular arrangement of projector and cameras may be used to reduce measurement time, to identify errors, and to automatically update compensation/calibration parameters. It should be appreciated that based on the epipolar geometry relationships described herein, the distance from the image scanner 22 to points on the surface being scanned may be determined. By moving the image scanner 22, the determination of the pose/orientation of the image scanner, and a registration process the three dimensional coordinates of locations (point data) on a surface may be determined.

Figure 4:
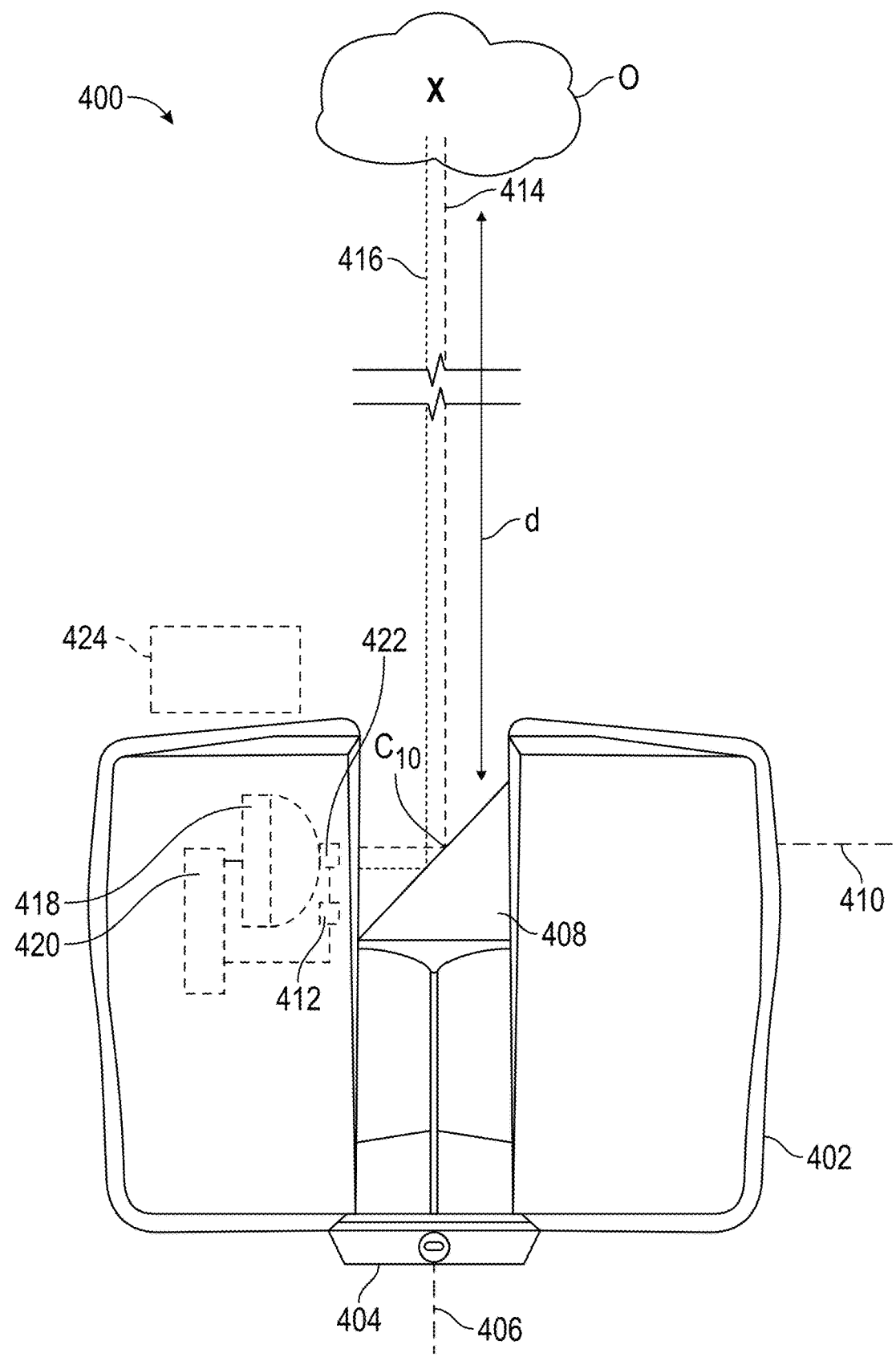
FIG. 4 is a side view of a 3D scanning system in accordance with an embodiment.

Referring now to FIG. 4, a 3D scanner or laser scanner 400 is shown for optically scanning and measuring the environment using time of flight methods. The laser scanner 400 comprises a measuring head 402 and a base 404. The measuring head 402 is mounted on the base 404 such that the measuring head 402 can rotate with respect to the base 404 about a first axis 406, driven by a first rotary drive (i.e. a motor). The rotation about the first axis 406 may be about the center of the base 404. The measuring head 402 comprises a mirror 408, which can rotate about a second axis 410, driven by a second rotary drive (i.e. a motor). Referring to a normal upright position of the laser 400, the first axis 406 may be called the vertical axis or azimuth axis, while the second axis 410 may be called the horizontal axis or zenith axis. The laser scanner 400 may comprise a gimbal point or center $C_{10}$ that is the intersection point of the first axis 406 and the second axis 410.

The measuring head 402 is further provided with an electromagnetic radiation emitter, such as light emitter 412, for example, that emits an emission light beam 414. In an embodiment, the emission light beam 414 may be a coherent light such as a laser beam. The laser beam may have a wavelength range of approximately 300 to 1600 nanometers, for example 790 nanometers, 905 nanometers, 1550 nanometers, or less than 400 nanometers. It should be appreciated that other electromagnetic radiation beams having greater or smaller wavelengths may also be used. The emission light beam 414 may be amplitude or intensity modulated, for example, with a sinusoidal waveform or with a rectangular waveform. Alternatively, the emission light beam 414 may be otherwise modulated, for example, with a chirp signal, or coherent receiver methods may be used. In the present embodiment, the emission light beam 414 is a continuous wave laser beam. However, it may also be a pulsed laser. The emission light beam 414 is emitted by the light emitter 412 onto the mirror 408, where it is deflected to the environment of the laser scanner 400.

A reflected light beam, hereinafter called a reception light beam 416, is reflected from the environment by an object O. The reflected or scattered light is intercepted by the rotary mirror 408 and directed onto a light receiver 418 with reception optics. The directions of the emission light beam 414 and the reception light beam 416 result from the angular positions of the measuring head 402 and the mirror 408 about the axes 406 and 410, respectively. These angular positions in turn depend on the corresponding rotary drives. The angle of rotation about the first axis 406 is measured by a first angular encoder. The angle of rotation about the second axis 410 is measured by a second angular encoder.

A controller 420 is coupled to communicate with the light emitter 412 and the light receiver 418 inside the measuring head 402. It should be appreciated that while the controller 420 is illustrated as being a single device or circuit, this is for exemplary purposes and the claims should not be so limited. In other embodiments, the controller 420 may be comprised of a plurality of devices or circuits. In some embodiments, a portion of the controller 420 may be arranged outside the measuring head 402, for example as a computer connected to the base 404.

The laser scanner 400 operation is controlled by controller 420. Controller 420 is a suitable electronic device capable of accepting data and instructions, executing the instructions to process the data, and presenting the results. Controller 420 may accept instructions through user interface, or through other means such as but not limited to electronic data card, voice activation means, manually-operable selection and control means, radiated wavelength and electronic or electrical transfer. Therefore, controller 420 can be a microprocessor, microcomputer, a minicomputer, an optical computer, a board computer, a complex instruction set computer, an ASIC (application specific integrated circuit), a reduced instruction set computer, a computer network, a desktop computer, a laptop computer, a scientific computer, a scientific calculator, or a hybrid of any of the foregoing.

Controller 420 is capable of converting the analog voltage or current level provided by sensors (e.g. encoders) into a digital signals. Alternatively, sensors may be configured to provide a digital signal to controller 420, or an analog-to-digital (A/D) converter (not shown) may be coupled between sensors and controller 420 to convert the analog signal provided by sensors (e.g. light receiver 418) into a digital signal for processing by controller 420. Controller 420 uses the digital signals act as input to various processes for controlling the system 400. The digital signals represent one or more system 10 data including but not limited to angular position about the axis 406, angular position about the axis 410, time of flight of the light beams 414, 416 and the like.

In general, controller 420 accepts data from sensors, light emitter 416 and light receiver 418, and is given certain instructions for the purpose of determining three-dimensional coordinates of points in the environment. Further, the controller 420 may compare operational parameters to predetermined variances and if the predetermined variance is exceeded, generates a signal that may be used to indicate an alarm to an operator. Additionally, the signal may initiate other control methods that adapt the operation of the laser scanner 400 such as changing or stopping the rotation about the axis 406 once a predetermined angular position is achieved.

In some embodiments, the laser scanner 400 may further include a color camera 424 that acquires two dimensional (2D) color images of the environment as the scan is performed. The 2D images are synchronized with the acquired 3D coordinate points. This allows for the association of a color or a texture with the 3D coordinate point by the controller 420. In some embodiments, the color camera 424 is disposed internally to the laser scanner 400 and acquires images via the mirror 408.

In addition to being coupled to one or more components within system 400, controller 420 may also be coupled to external computer networks such as a local area network (LAN) and the Internet. The LAN may interconnect one or more remote computers, which are configured to communicate with controller 420 using a well-known computer communications protocol such as TCP/IP (Transmission Control Protocol/Internet(^) Protocol), RS-232, ModBus, and the like. Additional laser scanners 400 may also be connected to the LAN with the controllers 400 in each of these laser scanners 400 being configured to send and receive data to and from remote computers and other laser scanners 400. The laser scanner 400 may further be connected via the LAN with one or more 3D imagers 20. The LAN may further be connected to the Internet, which allows controller 420 to communicate with one or more remote computers connected to the Internet.

In an embodiment, the controller 420 includes a processor coupled to a random access memory (RAM) device, a non-volatile memory (NVM) device, a read-only memory (ROM) device, one or more input/output (I/O) controllers, and a LAN interface device via a data communications bus.

Controller 420 includes operation control methods embodied in application code, such as that shown in FIG. 7 for example. These methods are embodied in computer instructions written to be executed by a processor, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, Visual C++, Java, ALGOL (algorithmic language), BASIC (beginners all-purpose symbolic instruction code), visual BASIC, ActiveX, HTML (HyperText Markup Language), and any combination or derivative of at least one of the foregoing. Additionally, an operator can use an existing software application such as a spreadsheet or database and correlate various cells with the variables enumerated in the algorithms. Furthermore, the software can be independent of other software or dependent upon other software, such as in the form of integrated software.

The controller 420 is configured to perform operational control methods that determine, for a multitude of measuring points X, a corresponding number of distances d between the laser scanner 400 and the measuring points X on object O. The distance to a particular measuring point X is determined based at least in part on the speed of light in air through which electromagnetic radiation propagates from the device 400 to the measuring point X. In an embodiment, the phase shift in the modulated light beam 414, 416 sent to the measuring point X and received from it, is determined and evaluated to obtain a measured distance d.

The speed of light in air depends on the properties of the air such as the air temperature, barometric pressure, relative humidity, and concentration of carbon dioxide. Such air properties influence the index of refraction of the air. The speed of light in air is equal to the speed of light in vacuum divided by the index of refraction. A laser scanner of the type discussed herein is based on the time-of-flight of the light in the air (the round-trip time for the light to travel from the device to the object and back to the device). A method of measuring distance based on the time-of-flight of light (or the time-of-flight of any type of electromagnetic radiation) depends on the speed of light in air and is therefore distinguishable from methods of measuring distance based on triangulation, such as the 3D imager 20 as illustrated and described with respect to FIGS. 1-3. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on known length and two known angles of a triangle. The method of triangulation, therefore, does not directly depend on the speed of light in air.

Figure 5:
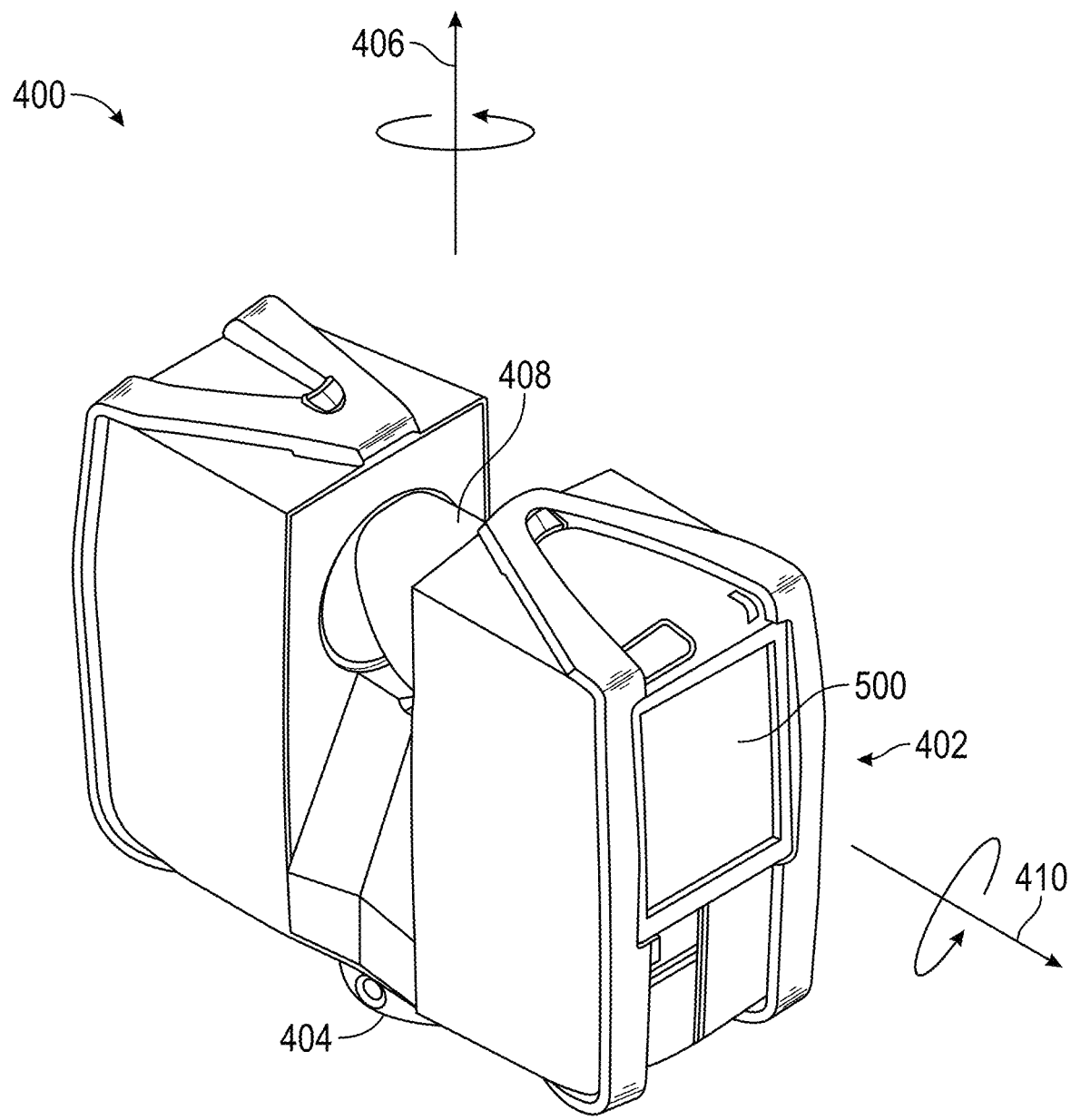
FIG. 5 is a perspective view of the 3D scanning system of FIG. 4.

In an embodiment, the measuring head 402 may include a display device 500 (FIG. 5) integrated into the laser scanner 400. The display device 500 includes a user interface, which may be a graphical touch screen. For example, the display device 500 may have a user interface that allows the operator to provide measurement instructions to the laser scanner 400, in particular to set the parameters or initiate the operation of the laser scanner 400, and the display device 500 may also display measurement results.

In an embodiment, the scanning of the environment of the laser scanner 400 takes place by rotating the mirror 408 relatively quickly about the second axis 410 while rotating the measuring head 402 relatively slowly about the first axis 406, thereby moving the assembly in a spiral pattern. In an exemplary embodiment, the rotary mirror 408 rotates at a maximum speed of 5820 revolutions per minute. A scan is defined to be the entity of measuring points X in such a measuring. For such a scan, the center Cm defines the origin of the local stationary reference system. The base 404 rests in this local stationary coordinate frame of reference.

In addition to measuring a distance d from the center $C_{10}$ to a measuring point X on the object O, the laser scanner system 10 may also collect gray-scale values related to the received optical power. The gray-scale value may be determined, for example, by integration of the bandpass-filtered and amplified signal in the light receiver 418 over a measuring period attributed to the measuring point X. In some embodiments, color images can be generated by a color camera 424. Through use of these color images, colors (R, G, B) or texture can be assigned to the measuring points X as additional values.

Referring now to FIGS. 6-7, an embodiment is shown of a measurement system 600 and a method 700 of operating the system 600. It should be appreciated that while the laser scanner 400 is capable of determining the 3D coordinates of a large number of points within a volume 602, there may be locations within the environment where measurements are not performed due to the surface being in a location that is not reachable by the light beam 414. Further, in some embodiments, it may be desirable to obtain additional 3D coordinates (e.g. a denser point cloud) of certain areas of interest. For example, in the embodiment of FIG. 6, the object O has a surface 604 that is on an opposite side from the laser scanner 400. As such, no light beam 416 is reflected and no measurements are made of the surface 604 by the laser scanner 400. Typically, to obtain measurements from these regions, the laser scanner 400 would be moved to a new location and one or more additional scans performed. In some embodiments, this may be undesirable due to the time to move and set up the laser scanner 400 and the registration of the two data sets into a common frame of reference.

The measurement system 600 allows for multiple coordinate measurement devices, such as the 3D imager 20 and the laser scanner 400 for example, to cooperate in the acquisition and determination of 3D coordinates of points that are not measurable by the laser scanner 400, such as surface 604 for example. In an embodiment, the method 700 of obtaining the coordinates starts in block 702 where the 3D imager 20 is placed within the volume 602 that is measurable by the laser scanner 400. In other words, 3D coordinates of points on the surfaces of the 3D imager 20 are determined by the laser scanner 400 during the scanning operation of the laser scanner 400.

The method 700 then proceeds to block 704 where the operation of the laser scanner 400 is initiated. As described herein, the laser scanner 400 operates by rotating slowly about the axis 406 while rotating the mirror 408 rapidly about the axis 410. This causes the light beams 414 to be emitted into the environment and the reflected light beam 416 to be received and 3D coordinates determined. The method 700 then proceeds to block 706 where the location of the 3D imager 20 is determined. It should be appreciated that since the 3D imager 20 is within the volume 602, 3D coordinates of points on the surface of the 3D imager 20 are determined. Further, the shape of the 3D imager 20 is predetermined and known. Thus, the location (e.g. x, y, z coordinates or an equivalent frame of reference) and pose (e.g. pan, tilt and roll) of the 3D imager 20 may be determined from the scan performed by the laser scanner 400.

The method 700 then proceeds to block 708 where the operation of the 3D imager 20 is initiated. In the embodiment of FIG. 6, the operator moves the 3D imager 20 to positions where the 3D imager 20 may determine the 3D coordinates of points on surfaces that were not measured by the laser scanner 400, such as surface 604 for example, in the manner described herein with reference to FIGS. 2-3. It should be appreciated that the 3D coordinates of the points measured and determined by the 3D imager 20 are in a different frame of reference (the 3D imager frame of reference) than those determined by the laser scanner 400 (the laser scanner frame of reference).

The method 700 then proceeds to block 710 where the 3D coordinates of points measured by the 3D imager 20 are transformed from the 3D imager frame of reference into the laser scanner frame of reference. It should be appreciated that since the starting location of the 3D imager 20 is known, as determined in block 706, the origin of the 3D imager frame of reference is also known. Thus the 3D coordinates of points measured and determined by the 3D imager and those measured and determined by the laser scanner 400 may be transformed into a common coordinate frame of reference. It should be appreciated that in other embodiments, the coordinates determined by the laser scanner 400 may be transformed into the 3D imager frame of reference, or the coordinates determined by the 3D imager 20 and laser scanner 400 may be transformed into a third coordinate frame of reference.

With the transformation of the coordinates completed, the method 700 then proceeds to block 712 where the 3D coordinate data (now in a common frame of reference) from the 3D imager 20 and the laser scanner 400 are merged into a single data set. The method 700 may, in some embodiments, then store the merged data set in memory, such as in the laser scanner 400, the 3D imager 20 or in a computing device connected (such as via the LAN) to the laser scanner 400 and 3D imager 20.

It should be appreciated that while embodiments herein refer to a TOF measurement device determining the initial position of the imager device, this is for exemplary purposes and the claims should not be so limited. In other embodiments, the imager device measures the position of the TOF measurement device as part of the scanning process and the 3D coordinates of the TOF measurement device and the imager device are placed in a common coordinate frame of reference based on the initial position measurement by the imager device. Further, in still other embodiments, the position of one measurement device (e.g. TOF measurement device or the imager device) may be performed after the scan by the other measurement device. In other words, the imager device may perform a scan and the TOF measurement device may measure its final position.

Figures 9, 10:
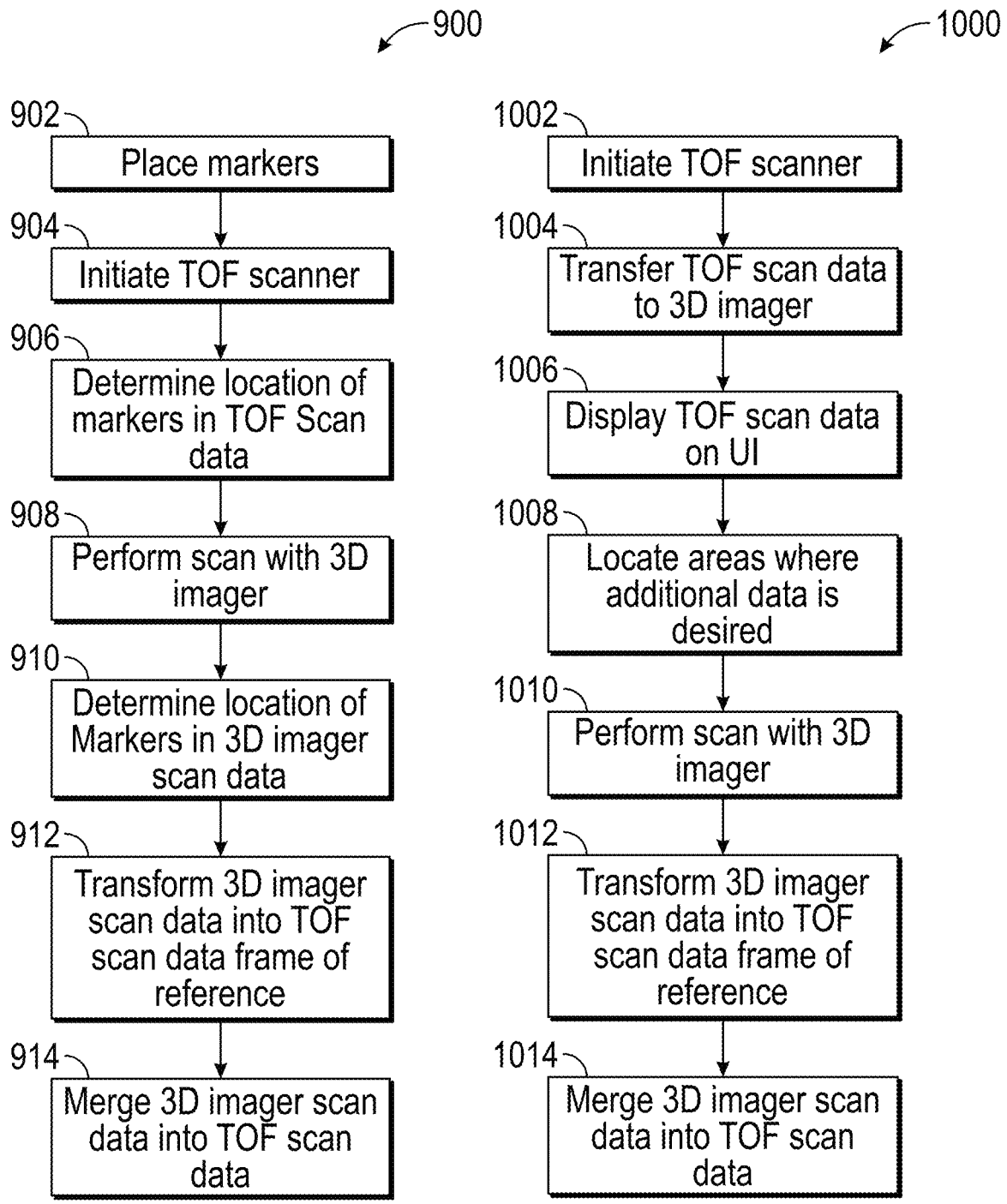
FIG. 9 is a flow diagram of a method of operating the 3D measurement system of FIG. 8 in accordance with an embodiment.
FIG. 10 is a flow diagram of a method of operating a 3D measurement system having a 3D imager and a 3D scanner of FIG. 1 and FIG. 4 respectively, in accordance with another embodiment.

Referring now to FIGS. 8-9, another embodiment is shown of a measurement system 800 and a method 900 of operating the system 800. This embodiment is similar to that shown in FIGS. 6-7 with the laser scanner 400 cooperating with the 3D imager 20 to acquire and determine 3D coordinates of points in the environment not directly measurable by the laser scanner 400, such a surface 802 of object O. In this embodiment, the method 900 starts in block 902 with markers 804, 806, 808 being placed in a location in the environment, such as wall 810 for example, where the markers 804, 806, 808 may be directly measured by both the laser scanner 400 and the 3D imager 20. It should be noted that in this embodiment, the 3D imager 20 may not be within the volume measured by the laser scanner 400 when the scan is performed by the laser scanner 400. The markers 804, 806, 808 may be any suitable marker, such as a photogrammetric markers for example. In an embodiment, the markers 804, 806, 808 may be planar or spherical. In an embodiment, at least three markers are used.

The method 900 then proceeds to block 904 where the operation of the laser scanner 400 is initiated and a scan performed as described herein. Once the scan is completed by the laser scanner 400, the method 900 then proceeds to block 906 wherein the location of the markers 804, 806, 808 is determined from the 3D coordinate data determined by the laser scanner 400. In an embodiment, a center position of the markers is determined from the 3D coordinate data. It should be appreciated that in an embodiment the shape and size of the markers 804, 806, 808 are predetermined and known, allowing the position of the markers 804, 806, 808 to be automatically determined.

The method 900 then proceeds to block 908 where the operation of the 3D imager 20 is initiated and a scan of the surfaces not measurable by the laser scanner 400, such as surface 802 for example, are performed. As part of the scanning operation of the 3D imager 20, the markers 804, 806, 808 are also scanned. As discussed above, the coordinates of the points measured and determined by the 3D imager 20 are in a local or 3D imager coordinate frame of reference. The method 900 the proceeds to block 910 where the location of the markers 804, 806, 808 in the coordinate data set generated by the 3D imager 20 is performed.

It should be appreciated that since the location of the markers 804, 806, 808 has been determined in both the coordinates measured and determined by the laser scanner 400 and those measured and determined by the 3D imager 20, the coordinates from each coordinate data set may be transformed into a common coordinate frame of reference. In the exemplary embodiment, the method 900 proceeds to block 912 where the coordinates measured and determined by the 3D imager 20 are transformed into the laser scanner 400 coordinate frame of reference.

The method 900 then proceeds to block 914 where the transformed 3D imager coordinates are merged into the laser scanner 3D coordinates. In an embodiment, the merged data set is stored in memory, such as in the laser scanner 400, the 3D imager 20 or in a computing device connected (such as via the LAN) to the laser scanner 400 and imager 20.

Referring now to FIG. 10, an embodiment of a method 1000 for measuring and determining the 3D coordinates of points not measurable by a laser scanner 400 with the measurement systems 600, 800. The method 1000 starts in block 1002 with the initiation of operation of the laser scanner 400 and the performing of a scan of the environment. The method 1000 then proceeds to block 1004 where the 3D coordinates measured and determined by the laser scanner 400 (the laser scanner point cloud) are transferred to the 3D imager 20. The transfer of the laser scanner point cloud to the 3D imager 20 may be performed by any known data transfer method, such as via a wired or wireless communications medium for example. In an embodiment, the laser scanner point cloud is transferred via the LAN.

The method 1000 then proceeds to block 1006 where the laser scanner point cloud data is displayed on the user interface 52 (FIG. 1) of the 3D imager. It should be appreciated that this allows the operator of the 3D imager to visualize where there are a lack of data points (e.g. surfaces 604, 802) in the measured environment. In one embodiment, the method 1000 proceeds to block 1008 where the areas where additional measurements may be performed is automatically determined by comparing the laser scanner point cloud to a parameter, such as a density of points parameter. Where the parameter is below a predetermined threshold, the area where additional measurements are to be performed may be highlighted or indicated with a graphical indicator on the user interface 52.

The method 1000 then proceeds to block 1010 where the operator initiates operation of the 3D imager 20 and a scan is performed of the areas where additional coordinate data is desired. Since the 3D imager 20 has the laser scanner point cloud data, the scan by the 3D imager 20 may be registered to the laser scanner point cloud through cardinal points (e.g. points common to both scans) or through natural feature recognition for example.

The method 1000 then proceeds to block 1012 where the coordinate data of the 3D imager 20 and the laser scanner point cloud are transformed into a common coordinate frame of reference. In the exemplary embodiment, the common coordinate frame of reference is the laser scanner coordinate frame of reference. The method 1000 then proceeds to block 1014 where the transformed 3D coordinates measured and determined by the 3D imager 20 are merged into the laser scanner point cloud. In an embodiment, the merged data set is stored in memory, such as in the laser scanner 400, the 3D imager 20 or in a computing device connected (such as via the LAN) to the laser scanner 400 and imager 20.

Figure 11:
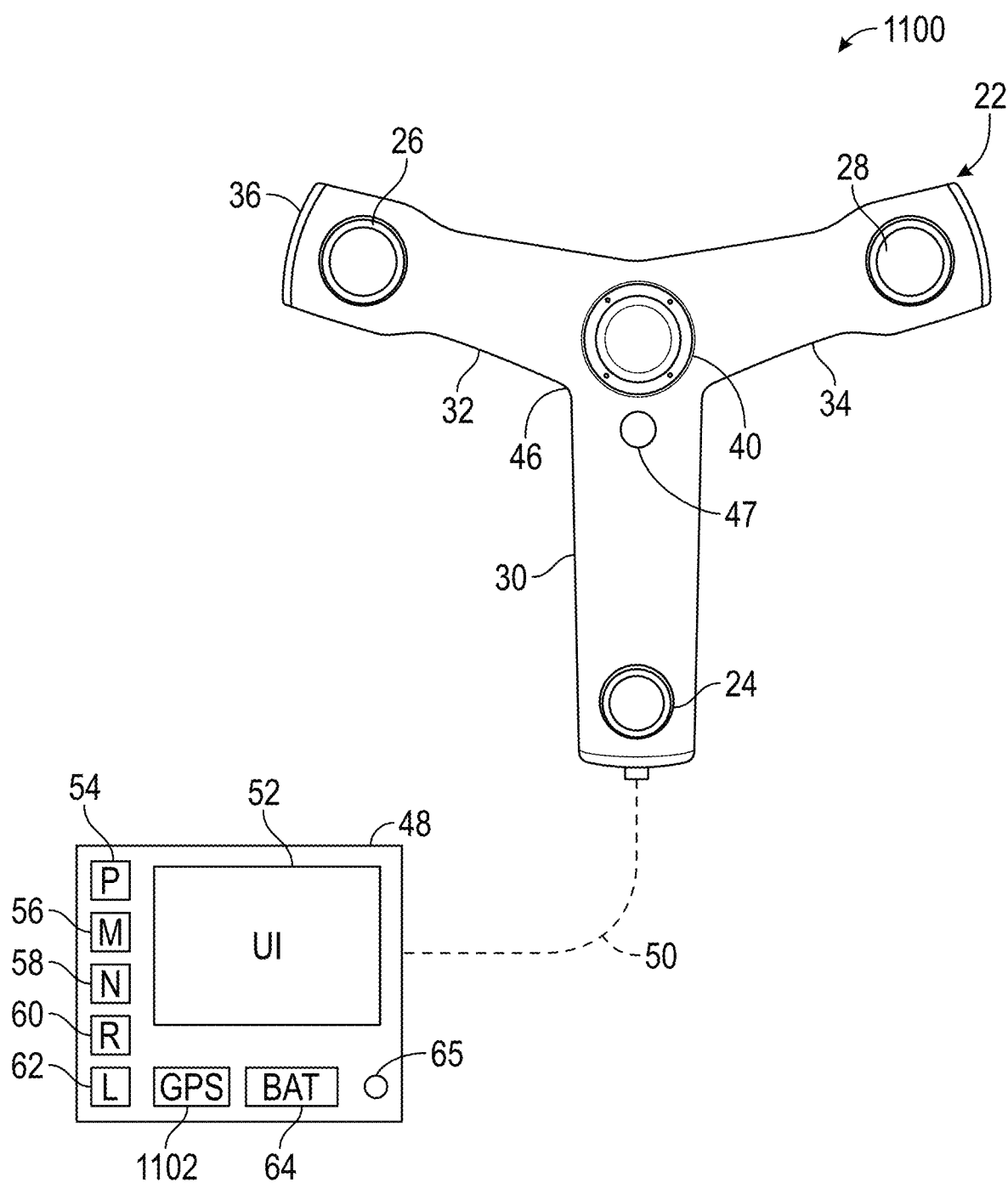
FIG. 11 is a is a view of a 3D imager system in accordance with another embodiment.

Referring now to FIGS. 11-12, an embodiment is illustrated of a 3D imager 1100 and a method 1200 of operating a measurement system (such as measurement system 600, 800) that includes the 3D imager 1100. The 3D imager 1100 is the same as the 3D imager 20 of FIG. 1, with the addition of a positioning device 1102. In the exemplary embodiment, the positioning device 1102 is a Global Positioning System (GPS) that is a spaced-based radio-navigation system that allows the determination of the geolocation of the 3D imager 1100. It should be appreciated that the positioning device 1102 may also be based on other positioning system, such as but not limited to: GLONASS, Galileo, Beidou, IRNSS and QZSS for example. The positioning device 1102 allows for the determination of the position of the 3D imager 20 in the GPS frame of reference.

The method 1200 starts in block 1202 where the laser scanner 400 is placed at a first location where the GPS position/coordinates are known. In an embodiment, the laser scanner 400 includes an integrated positioning device (e.g. a GPS receiver). In other embodiments, the position of the laser scanner 400 is measured with an external GPS device. The method 1200 then proceeds to block 1204 where operation of the laser scanner 400 is initiated and the scan of the environment is performed.

The method 1200 then proceeds to block 1206 where the 3D imager 1100 is moved to a GPS position within the environment and a scan is performed with the 3D imager in block 1208. In an embodiment, the position of the 3D imager 1100 may be continuously or periodically determined by the positioning device 1102.

The method 1200 then proceeds to block 1210 where the 3D coordinates measured and determined by the 3D imager 1100 and the 3D coordinates measured and determined by the laser scanner 400 are transformed into a common coordinate frame of reference based on the GPS positions measured by positioning device 1102. In some embodiments, the GPS position accuracy is insufficient to directly transform the 3D coordinates from one from of reference to another. In these embodiments, the GPS coordinates are used to provide a rough positioning of the respective point clouds and the registration is performed via a point cloud to point cloud registration process.

In the exemplary embodiment, the 3D coordinates of the 3D imager 1100 are transformed into the laser scanner coordinate frame of reference. The method 1200 then proceeds to block 1212 where the transformed 3D coordinates measured and determined by the 3D imager 1100 are merged into the 3D coordinates measured and determined by the laser scanner 400. In an embodiment, the merged data set is stored in memory, such as in the laser scanner 400, the 3D imager 20 or in a computing device connected (such as via the LAN) to the laser scanner 400 and imager 20.

Referring now to FIG. 13, another embodiment is shown of a method 1300 for measuring and determining the 3D coordinates of points not measurable by a laser scanner 400 with the measurement systems 600, 800. As discussed herein, during the operation of the 3D imager 20, a plurality of camera images (e.g. three images) are acquired and are grouped together as a frame. The frames are registered to each other in the local coordinate frame of reference. The method 1300 instead registers these frames to the laser scanner point cloud allowing additional data points from each individual frame to be added to the coordinate data set.

The method 1300 starts in block 1302 with the initiation of the laser scanner 400. A scan of the environment is performed by rotating the laser scanner 400 slowly about the axis 406 with the mirror 408 rotating rapidly about the axis 410 to reflect and receive the light beams 414, 416 as described herein. The 3D imager 20 is moved into position in block 1304 and the desired areas are scanned with the 3D imager in block 1306. Each frame acquired by the 3D imager 20 is stored. It should be appreciated that from each frame 3D coordinates may be deduced.

The method 1300 then proceeds to block 1308 where each of the frames acquired by the 3D imager 20 is registered to the 3D coordinates measured and determined by the laser scanner 400 (the laser scanner point cloud). The registration of the frames may be performed using the 3D points deduced from each frame and matching at least some of the points to the laser scanner point cloud. It should be appreciated that the points between the two point clouds do not need to be matched exactly, but rather may be aligned using a best fit/match method. It has been found that advantages may be realized in the registration of the point louds if one of the point clouds has a point density above a predetermined threshold (e.g. a dense point cloud). In another embodiment, the registration is performed based on image analysis of the color images acquired by the camera 40 and a color camera 422 coupled to the laser scanner 400. In still another embodiment, the frames acquired by the 3D imager 20 are individually registered to the 3D coordinates of the laser scanner 400 in real-time or near real-time as the scan is being performed by the 3D imager 20.

With each of the frames registered to the laser scanner point cloud, the 3D coordinates measured and determined by the 3D imager 20 may be transformed into the laser scanner coordinate frame of reference in block 1310. Once the 3D coordinates of the laser scanner 400 and the 3D imager 20 have been transformed into a common coordinate frame of reference, the method 1300 proceeds to block 1312 where the 3D coordinates measured and determined by each device 20, 400 are merged into a single data set. In an embodiment, the merged data set is stored in memory, such as in the laser scanner 400, the 3D imager 20 or in a computing device connected (such as via the LAN) to the laser scanner 400 and imager 20.

Figure 14:
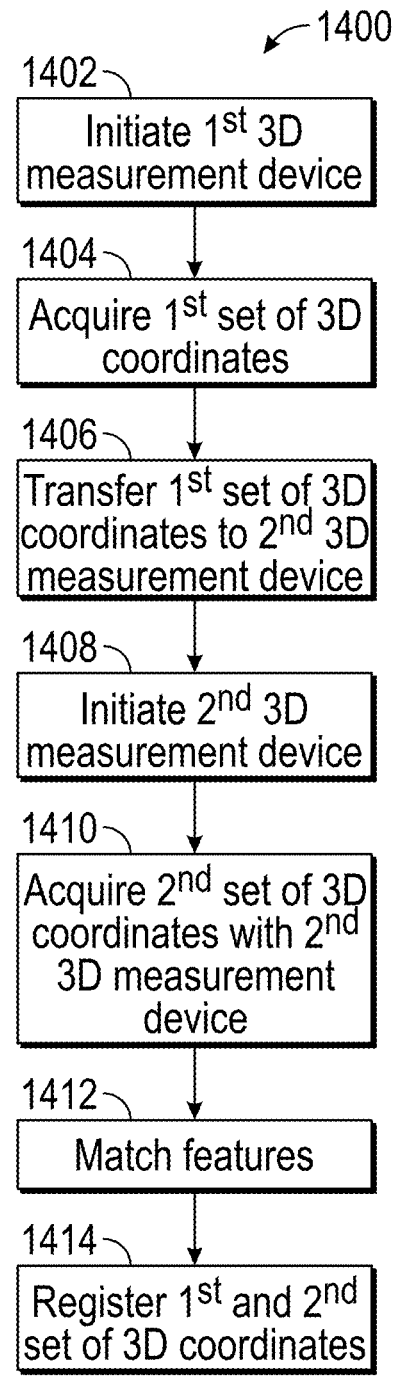
FIG. 14 is a flow diagram of a method of operating a 3D measurement system having a first 3D measurement device and a second 3D measurement device in accordance with another embodiment.

Referring now to FIG. 14, a method 1400 is shown for acquiring 3D coordinates of an object or surfaces in the environment through the cooperative operation of a first 3D measurement device, such as a TOF measurement device for example, with a second 3D measurement device, such as an imager device. The method 1400 starts in block 1402 where the operation of the first 3D measurement device is initiated. The method 1400 then proceeds to block 1404 where a first set of 3D coordinates is acquired. In an embodiment, the first set of 3D coordinates may be acquired from a plurality of surfaces. In another embodiment, at least one of the plurality of surfaces is part of the second 3D coordinate device.

The method 1400 then proceeds to block 1406 where the first set of 3D coordinates is transferred to the $2^{nd}$ 3D measurement device. In an embodiment, the transfer may be via a wired or wireless communications medium. The method 1400 then proceeds to block 1408 where the operation of the second 3D measurement device is initiated. As the second 3D measurement device acquires a second set of 3D coordinates in block 1410, the method 1400 matches features between the first set of 3D coordinates and the second set of 3D coordinates in block 1412. The features may include natural texture (e.g. colors), natural features (e,g, corners, edges, planes), artificial features (e.g. targets), artificial texture (e.g. markers) or a combination thereof. In an embodiment, when at least three features are matches, the first set of 3D coordinates and the second set of 3D coordinates are registered together in block 1414 and may be transformed into a common coordinate frame of reference. In an embodiment, the common coordinate frame of reference is the frame of reference of the first 3D measurement device.

In an embodiment, when the second set of 3D coordinates are registered with the first set of 3D coordinates, the combination of the first and second set of 3D coordinates may be displayed on a display associated with the second 3D measurement device. In this manner, the operator of the second 3D measurement device may visualize areas where additional scanning may be desired. In an embodiment, a visual indicator is displayed on the display in areas where the acquired 3D coordinates have a parameter (e.g. point cloud density) that is less than a threshold.

Further, embodiments herein describe the scans performed by the TOF measurement device and the imager device as being sequential, e.g. the TOF measurement device scan is performed and then the imager device scan is performed. This is for exemplary purposes and the claims should not be so limited. In other embodiments, the TOF measurement device and the imager device are operated in a cooperative manner at the same time. In this embodiment, the devices may communicate in real-time or near real-time to allow the operator of the imager device to receive indications of what areas of the object or the environment need additional scanning. In one embodiment, as the TOF measurement device scan is performed, the point cloud generated by the TOF measurement device is transmitted to the imager device and displayed for the operator of the measurement device. As such, the operator may visually identify areas where additional scanning is desired. In one embodiment, areas of the point cloud that do not conform with a desired characteristic (e.g. point density is less than a threshold or an area of a potential undercut), are highlighted for the operator to indicate areas where additional scanning is desired.

In still further embodiments, multiple measurement devices (e.g. multiple imager devices or multiple TOF measurement devices) may be used simultaneously. For example, one or more TOF measurement devices may be cooperatively operated with one or more imager devices. In an embodiment, the displays associated with each of the measurement devices are synchronized to include point cloud data acquired by other measurement devices. In this way, the operator of a particular measurement device may identify areas where additional scanning may be desired. In an embodiment, the identification of areas that do not have a desired characteristic (e.g. point cloud density less than a threshold of areas of a potential undercut) are highlighted (e.g. an outline of the area is indicated by a predefined color) to show the operator where additional scanning may be desired.

Figure 15:
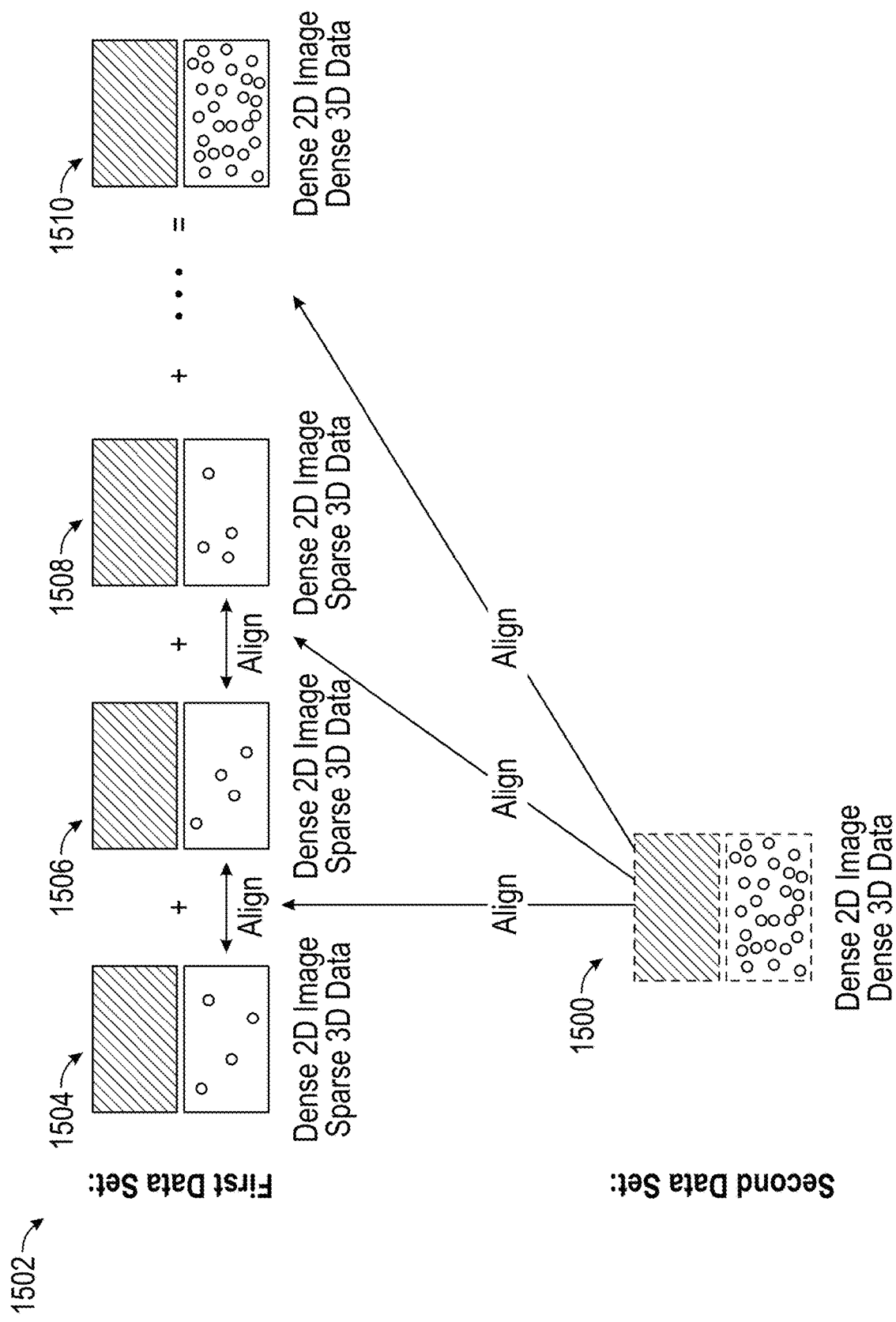
FIG. 15 is a schematic illustration of a method of registering sparse 3D data sets using a dense 3D data set.
Figure 16:
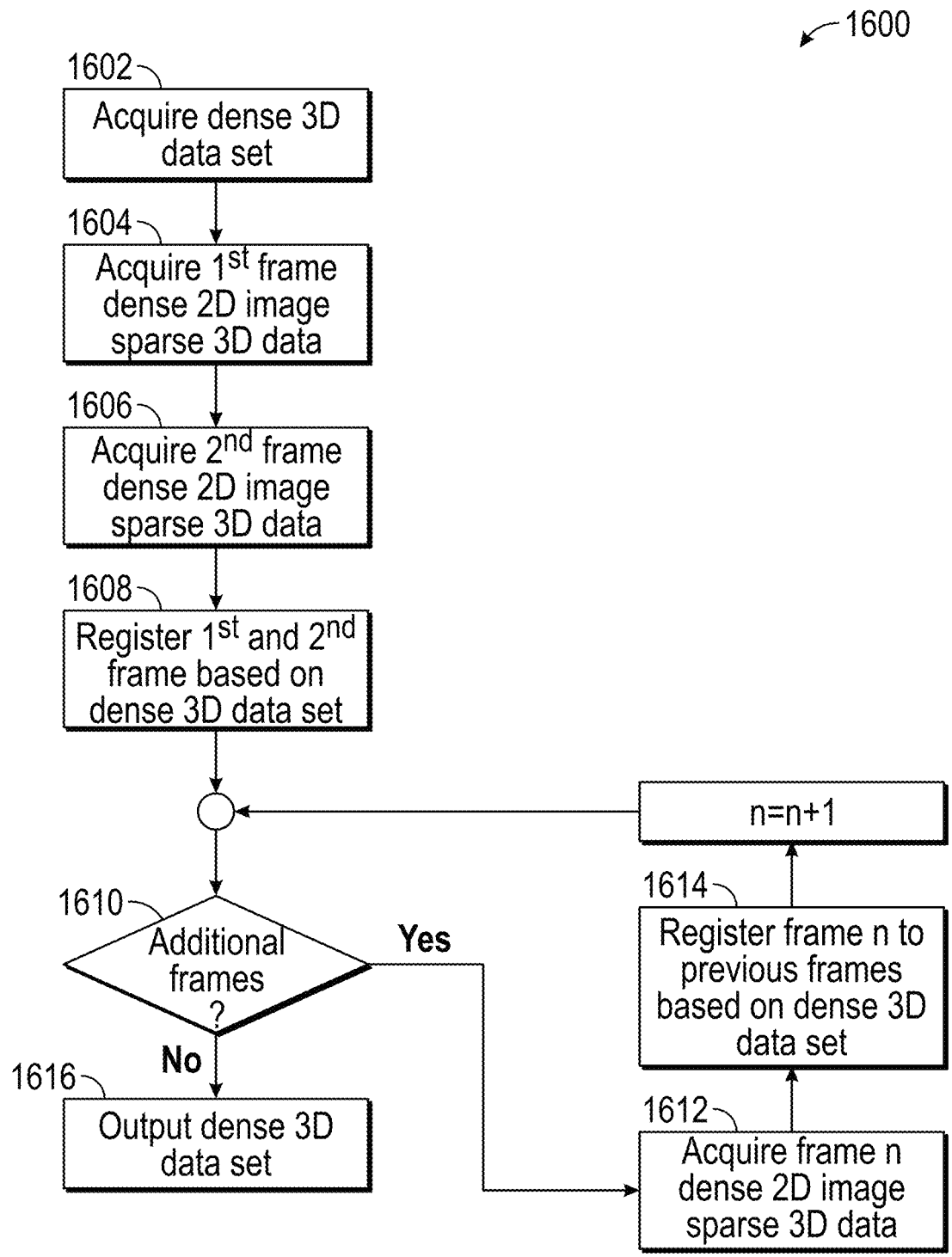
FIG. 16 is a flow diagram of the method of register of FIG. 15.

Referring now to FIG. 15 and FIG. 16, a method is shown of registering the frames of data that include a dense 2D image and sparse 3D data. It should be appreciated that some measurement devices (e.g. an imager device) generate frames with a high resolution color image (e.g. an XX megapixel image) that is dense in image data, while generating a relatively sparse 3D data set when compared to a 3D data set acquired by a TOF measurement device. As used herein, a "sparse" 3D data set has less 3D coordinate data than a "dense" 3D data set. In an embodiment, a dense 3D dataset will have a point distance on the order of the 3D resolution of the measurement device. A sparse 3D dataset will be less than the dense 3D dataset, such as an order of magnitude less for example. In an embodiment, the 3D resolution of the measurement device is about 1 mm. Further, the sparse 3D data set is part of a frame that is comprised of a high density 2D image, such as that acquired by camera 40 for example, and a sparse 3D point cloud acquired at the same time as the high density 2D image.

In an embodiment, a method 1600 is performed for registering the frames 1502 having sparse 3D data sets using a dense 3D data set 1500. It should be appreciated that the dense 3D data set 1500 may be acquired using any suitable 3D measurement device, such as but not limited to a TOF measurement device or an imager measurement device. The method 1600 begins in block 1602 where the dense 3D data set 1500 is acquired. The method 1600 then proceeds to block 1604 where the first frame 1504 is acquired. In the illustrated embodiments, the first frame 1504 (and subsequently acquired frames) are acquired by a measurement device, such as an imager measurement device. The method 1600 then proceed to block 1606 where a second frame 1506 is acquired.

Once the first two frames 1504, 1506 are acquired, the method 1600 then proceeds to align the frames 1504, 1506 with each other and with the dense 3D data set 1500 in block 1608. The position information of each frame gained from the alignment to the second data set can be used for the relative alignment of the two frames 1504, 1506. The alignment of the frames 1504, 1506 and the dense 3D data set is performed using the dense 2D images and may be performed on the basis of natural texture, natural geometry, artificial texture or artificial geometry information. In the illustrated embodiment, the alignment performed in block 1608 is performed directly after the acquisition of the second frame 1506 and may be performed in parallel with the acquisition of additional frames (e.g. frame 1508).

The method 1600 then proceeds to query block 1610 where it is determined if additional frames are acquired. When query block 1610 returns an affirmative, meaning that additional frames are or have been acquired, the method 1600 proceeds to block 1612 where frame "n" 1508 is acquired. This frame "n" 1508 is registered with the previous frames 1504, 1506 and the dense 3D data set 1500 in block 1614. It has been found that every frame that is added to the sequence is registered to the previous frames and to the dense 3D data set 1500, allowing for an overall more accurate registration.

It should be appreciated that each frame has two sources of alignment information, and these two sources need to be weighted appropriately in the alignment process. The process is recurrent, and the alignment of each frame of the sequence can be adapted with each frame that is added to the sequence. Generally, the weighting scheme used will be based to weight reliable alignment information more heavily than less reliable alignment information. In an embodiment, three frames are acquired. Frame 3 is aligned to frame 1 using natural texture features, giving as a result a position A of frame 3. The alignment will give a mean distance A between corresponding features in frame 3 and frame 1. In an ideal situation, the mean distance would be zero (i.e. all corresponding features have the same position after alignment) but due to the accuracy of feature recognition, this is highly unlikely. In the same way, the alignment of frame 3 to frame 2 will give a position B of frame 3 and a mean feature distance B. The position of frame 3 can now be calculated as a weighted mean of position A and position B. In an embodiment, the position will be determined according to the formula:

$$\text{position} = \frac{\frac{\text{position } A}{\text{mean distance } A} + \frac{\text{position } B}{\text{mean distance } B}}{\frac{1}{\text{mean distance } A} + \frac{1}{\text{mean distance } B}}$$

It should be appreciated that the above method of weighting frames is exemplary and the claims should not be so limited. In other embodiments, other weighting methods may be used.

Once the frame "n" 1508 has been aligned, the method 1600 loops back to query block 1610 and the process is repeated until the operate has acquired the desired coordinate data. When the query block 1610 returns a negative, the method 1600 proceeds to block 1616 where the final dense 3D data set 1510 is output. In some embodiments, a preliminary or intermediate dense 3D data set is displayed to the operator as the frames are acquired. The final dense 3D data set 1510 may be either a set of dense 3D data (and color information) consisting of the registered single frames or a set of dense 3D data which is already a combination of the frames and the dense 3D data set.

Figures 17, 18:
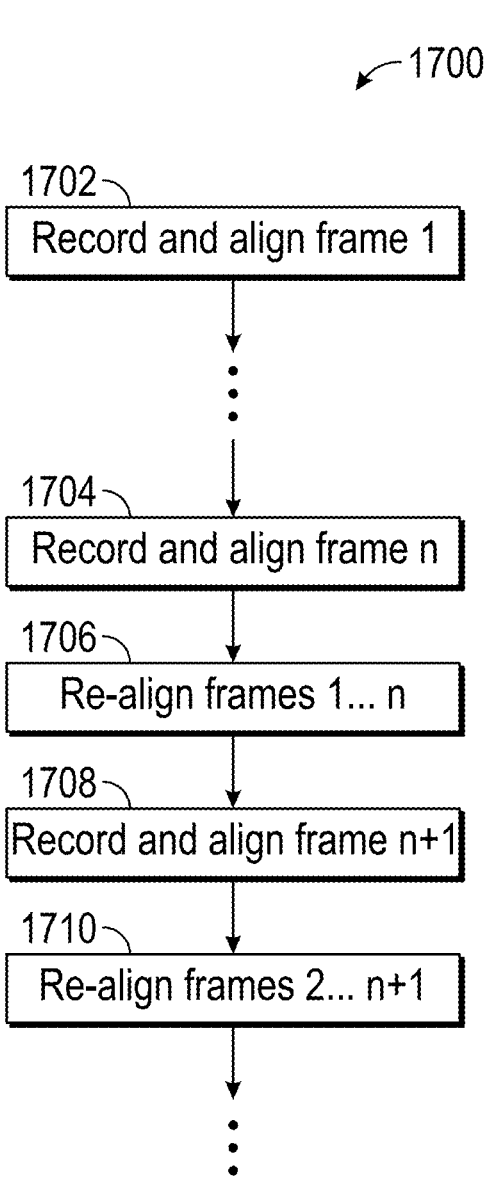
FIG. 17 is a flow diagram of a subsequence alignment.
FIG. 18 is another flow diagram of a subsequence alignment.

Referring now to FIG. 17, a method 1700 is shown for aligning sub-sequences. In this embodiment, a Frame 1 is recorded and aligned (if previous sparse 3D datasets are available) in block 1702. In an embodiment, the alignment is based on dense 2D image data. The method 1700 then proceeds to record and align "n" Frames of data (dense 2D image and sparse 3D data) to block 1704. The method 1700 then proceeds to block 1706 where realignment of Frames 1 to n is performed based on the previous alignment plus dense 3D data of the sub-sequence comprised of Frames 1 to n. The method 1700 then proceeds to block 1708 where Frame n+1 is recorded and aligned with the earlier acquired Frames. The method 1700 then proceeds to block 1710 where a realignment is performed based on the previous alignment plus the dense 3D data of the sub-sequence of Frames 2 to n+1.

Referring now to FIG. 18, another method 1800 is shown for aligning subsequences. In this embodiment, the method 1800 starts in block 1802 where Frame 1 is recorded and aligned (if previous sparse 3D datasets are available) in block 1802. In an embodiment, the alignment is based on dense 2D image data. The method 1800 then proceeds to record and align "n" Frames of data (dense 2D image and sparse 3D data) to block 1804. The method 1800 then proceeds to block 1806 where realignment of Frames 1 to n is performed based on the previous alignment plus dense 3D data of the sub-sequence comprised of Frames 1 to n. The method 1800 then proceeds to block 1808 where Frame n+1 is recorded and aligned with the earlier acquired Frames. The method 1800 proceeds in this manner until Frame n+m is recorded and aligned in block 1810. The method 1800 then proceeds to block 1812 where a realignment is performed based on the previous alignment plus the dense 3D data of the sub-sequence of Frames n+1 to m.

Figure 19:
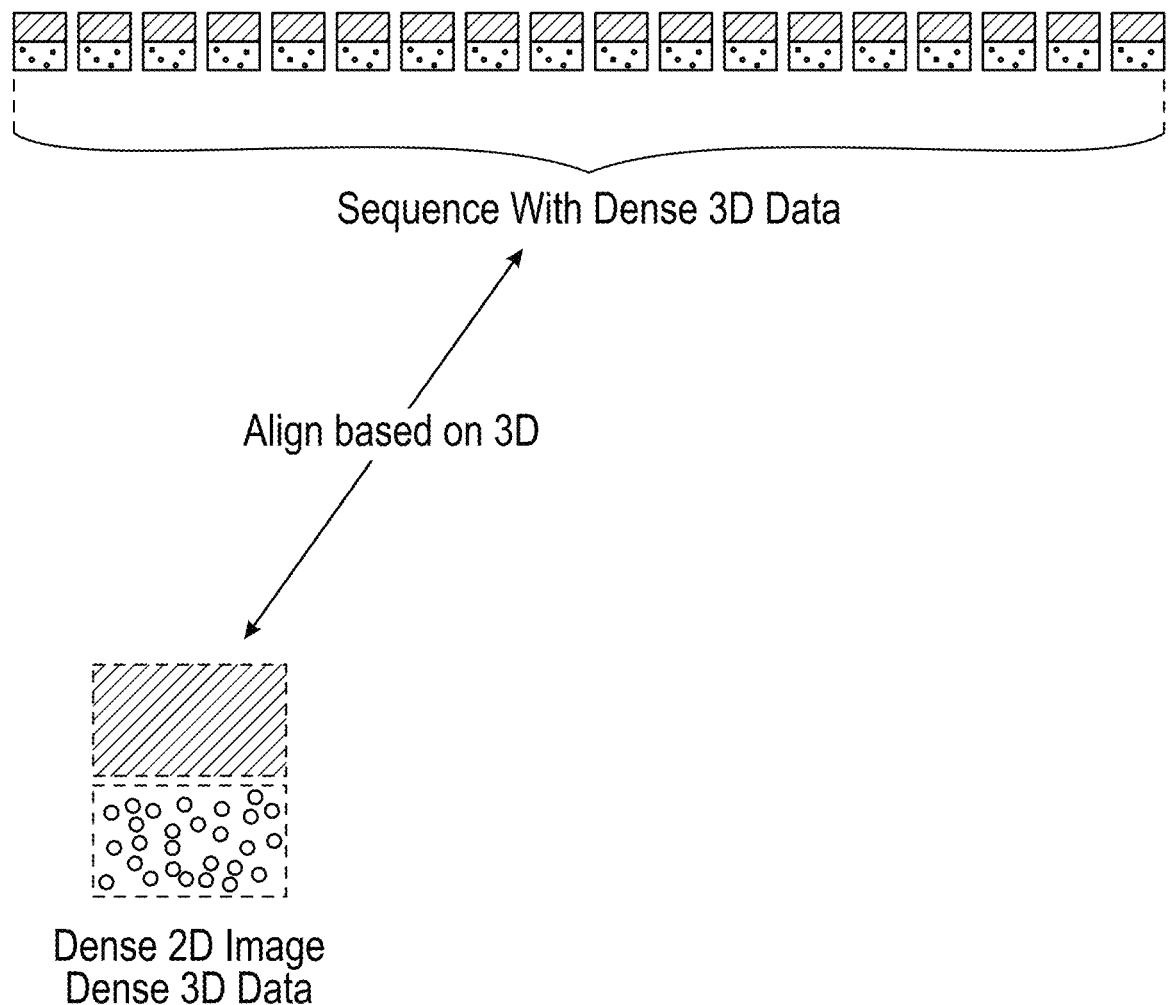
FIG. 19 is a schematic illustration of a method of registering sparse 3D data sets using a dense 3D data set.
Figure 20:
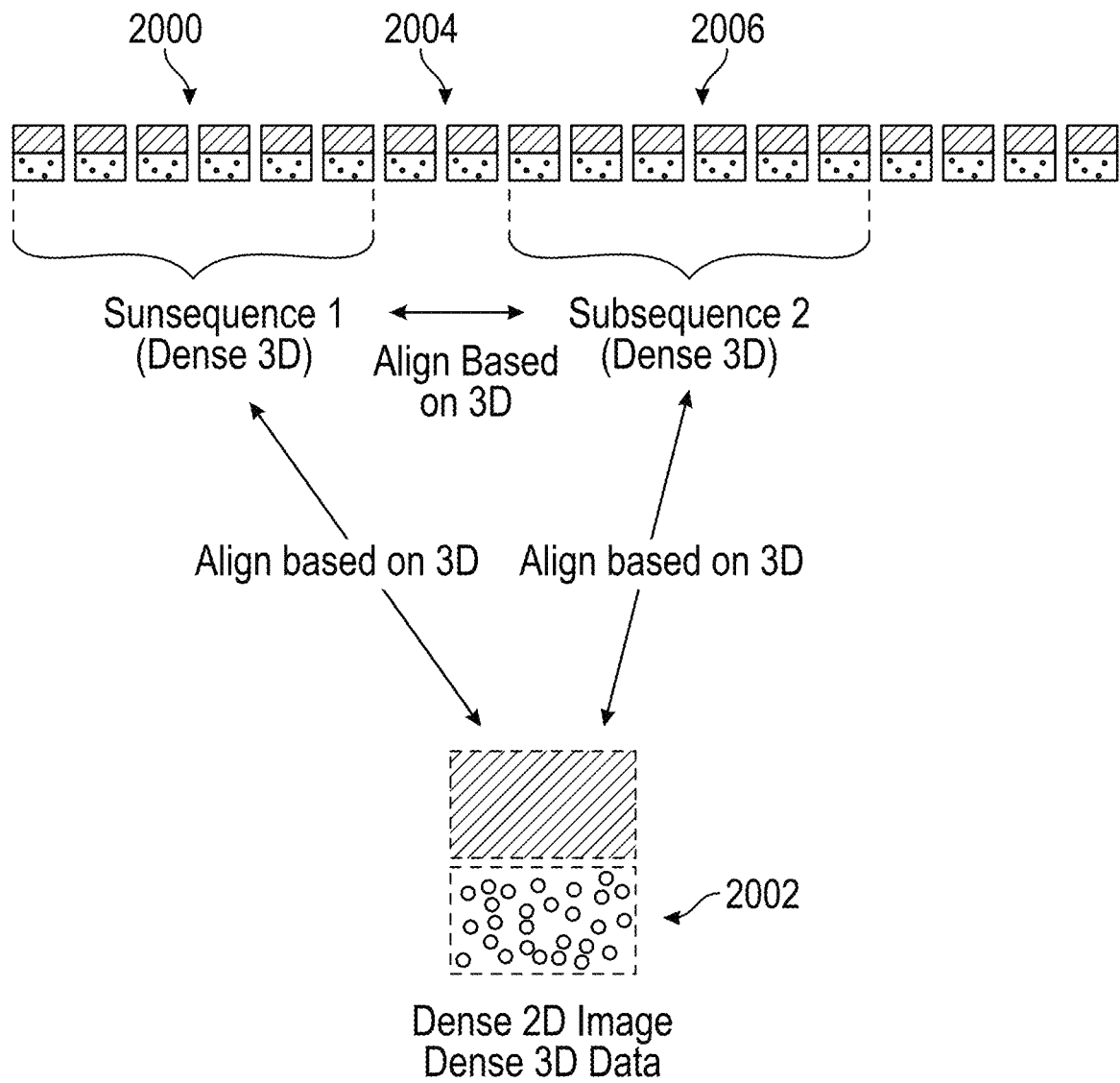
FIG. 20 is a schematic illustration of a method of aligning sub-sequences to a dense 3D data set when the sub-sequences do not overlap.
Figure 21:
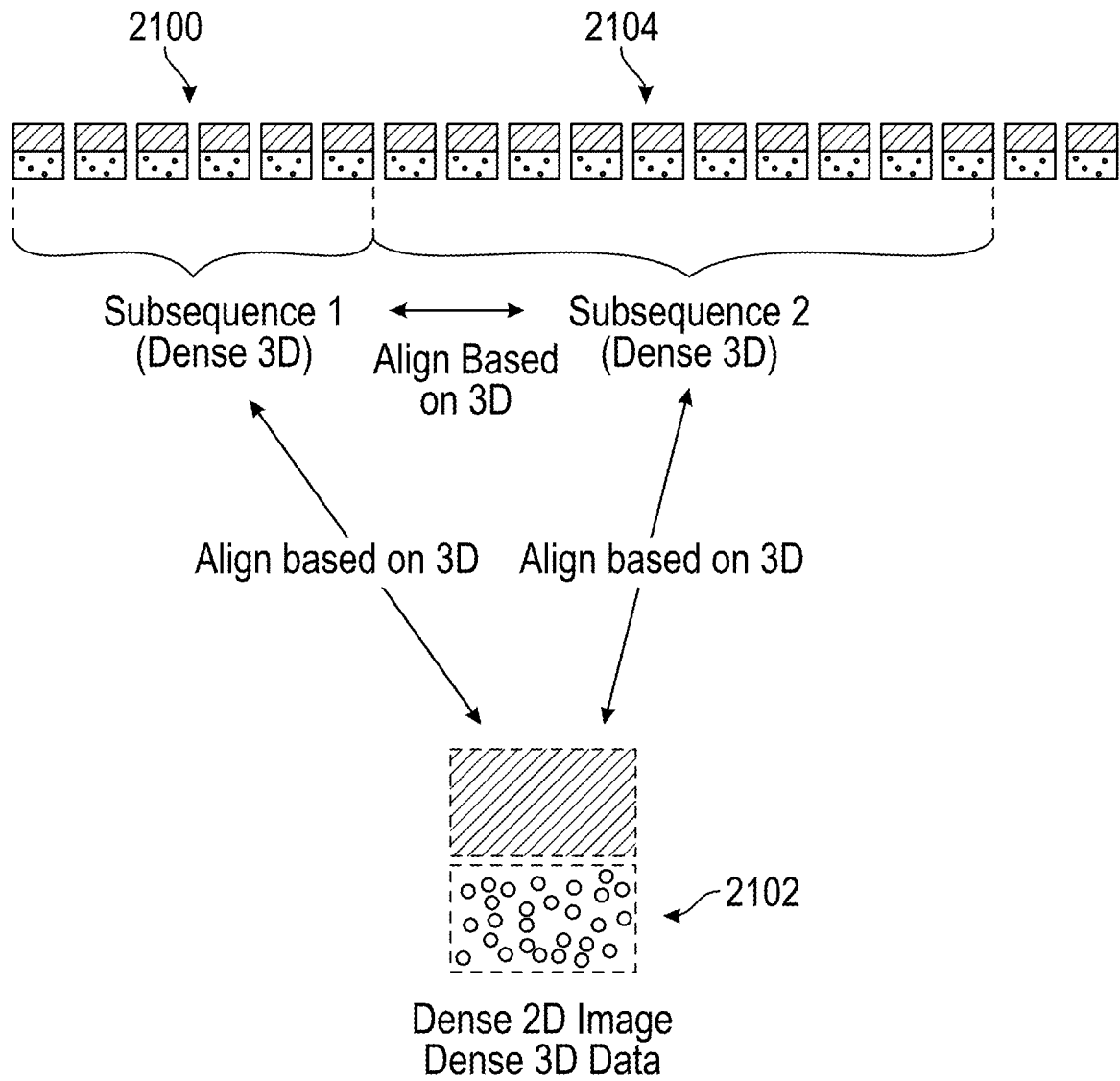
FIG. 21 is a schematic illustration of a method of aligning sub-sequences to a dense 3D data set when the sub-sequences overlap.

Referring now to FIG. 19-FIG. 21, several examples of aligning frames that may include sub-sequences of frames is shown. It should be appreciated that these are examples and not intended to be limiting on the claims. In the embodiment of FIG. 19, a sequence of frames is generated where the frames are aligned to each other using their dense 2D and sparse 3D data. The aligned sequence of frames is aligned to the dense 3D data set. In an embodiment, a realignment of the frames within the sequence (e.g. block 1706) is performed using the 3D data set.

Referring to FIG. 20, an embodiment is shown where frames are acquired where a portion of the frames are grouped into sub-sequences, such as sub-sequence 2000 and sub-sequence 2006. Each of the sub-sequences 2000, 2006 are aligned within the respective subsequence using the 2D data and the sparse 3D data of the frames within the respective sub-sequence. Once the frames of each sub-sequence 2000, 2006 are aligned within the respective sub-sequence, the sub-sequences 2000, 2006 are aligned to one another and to the dense 3D data set 2002 using the dense 3D data of the sub-sequences. This alignment of the sub-sequences can be performed even if the sub-sequences 2000, 2006 do not have any frames (e.g. frames 2004) in common, however they can overlap in both the 2D images and in the 3D data sets. Typically, adjacent or neighboring frames have a large (>90%) spatial overlap. As a result the sub-sequences can be registered even if the sub-sequences do not share frames.

Referring now to FIG. 21, an embodiment is shown where at least two sub-sequences of frames are acquired where the subsequences include several overlapping frames. In this embodiment, a first sub-sequence 2100 of frames is acquired by the measurement device. The frames of the first sub-sequence 2100 are aligned using the 2D images acquired by the measurement device and the sparse 3D data of the frames. A second sub-sequence 2104 is then acquired. The frames of the second sub-sequence 2104 are aligned to each other using the 2D images acquired by the measurement device and the sparse 3D data of the frames. The first sub-sequence 2100 and the second sub-sequence 2104 are then aligned to the 3D data set 2102 and the first sub-sequence 2100 is aligned to the second sub-sequence 2104.

In an embodiment, the synchronization of the measurement devices may be performed in real-time, or in near real-time. In still further embodiments, the synchronization of the point cloud data between the measurement devices may be performed using a computing device, or a plurality of computing devices connected together in a distributed computing network (e.g. a cloud based computing system).

Technical effects include the measurement of three-dimensional coordinates of an environment through the cooperation of multiple coordinate measurement devices to allow measurements of surfaces not measurable by a first coordinate measurement device to be measured by a second coordinate measurement device.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A three-dimensional (3D) measurement system comprising:
   a first 3D measurement device operable to measure and determine a first set of three-dimensional coordinates of a first surface in an environment and of a second surface, the first set of three-dimensional coordinates being in a first coordinate frame of reference;
   a second 3D measurement device includes the second surface, the second 3D measurement device operable to measure and determine a second set of three-dimensional coordinates of a third surface in the environment, the second set of three-dimensional coordinates being in an second coordinate frame of reference; and a processor operably coupled to the first 3D measurement device and the second 3D measurement device, the processor operable to execute nontransitory computer instructions when executed on the processor for transforming the first set of three-dimensional coordinates and the second set of three-dimensional coordinates into a common coordinate frame of reference, wherein the transformation is based at least in part on a portion of the first set of three-dimensional coordinates on the second surface.

2. The system of claim 1, wherein the processor is further operable to identify the second surface of the second 3D measurement device based at least in part on the portion of the first set of three-dimensional coordinates.

3. The system of claim 1, wherein the processor is further operable to determine a location and orientation of the second 3D measurement device based at least in part on the portion of the first set of three-dimensional coordinates.

4. The system of claim 3, wherein the transforming of the second set of 3D coordinates is based at least in part on the location and orientation of the second 3D measurement device.

5. The system of claim 1, further comprising:
a user interface associated with the second 3D measuring device; and
wherein the processor is further responsive to display the first set of three-dimensional coordinates on the user interface and display a graphical indicator in an area having a parameter less than a threshold.

6. The system of claim 5, wherein the parameter is a density of 3D coordinates in the area.

7. A three-dimensional (3D) measurement system comprising:
a first 3D measurement device operable to measure and determine a first set of three-dimensional coordinates of a first surface in an environment, the first set of three-dimensional coordinates being in a first coordinate frame of reference;
a second 3D measurement device operable to measure and determine a second set of three-dimensional coordinates of a second surface in the environment, the second set of three-dimensional coordinates being in a second coordinate frame of reference; and
a display operably coupled to one of the first 3D measurement device or the second 3D measurement device; and
one or more processors operably coupled to the first 3D measurement device or the second 3D measurement device, the one or more processors operable to execute nontransitory computer instructions when executed on the one or more processors for displaying a graphical indicator on the display indicating an area based in part on the first set of 3D coordinates having a parameter less than a threshold, wherein the parameter is a density of 3D coordinates in the area.

8. The system of claim 7, wherein the one or more processors are further responsive to displaying the graphical indicator based in part on a combination of the first set of 3D coordinates and the second set of 3D coordinates having the parameter less than the threshold.

* * * * *